US009275497B2

(12) United States Patent
Kikuta et al.

(10) Patent No.: US 9,275,497 B2
(45) Date of Patent: *Mar. 1, 2016

(54) METHOD AND DEVICE FOR FORMING SURFACE PROCESSED

(75) Inventors: Mamoru Kikuta, Saitama (JP); Kenjiro Miura, Shizuoka (JP); Daijiro Uzuyama, Shizuoka (JP); Kenji Takahashi, Shizuoka (JP)

(73) Assignees: CALSONIC KANSEI CORPORATION, Saitama (JP); National University Corporation Shizuoka University, Shizuoka (JP)

( * ) Notice: Subject to any disclaimer, the term of this patent is extended or adjusted under 35 U.S.C. 154(b) by 381 days.

This patent is subject to a terminal disclaimer.

(21) Appl. No.: 13/255,896

(22) PCT Filed: Feb. 26, 2010

(86) PCT No.: PCT/JP2010/053163
§ 371 (c)(1),
(2), (4) Date: Sep. 9, 2011

(87) PCT Pub. No.: WO2010/103942
PCT Pub. Date: Sep. 16, 2010

(65) Prior Publication Data
US 2012/0001908 A1    Jan. 5, 2012

(30) Foreign Application Priority Data

Mar. 9, 2009    (JP) ................................. 2009-055429
Sep. 9, 2009    (JP) ................................. 2009-207996

(51) Int. Cl.
*G06T 17/20*    (2006.01)
*G06T 19/00*    (2011.01)
(Continued)

(52) U.S. Cl.
CPC ................ *G06T 17/20* (2013.01); *G06F 17/50* (2013.01); *G06T 19/00* (2013.01); *B29C 33/3835* (2013.01); *B29C 33/424* (2013.01); *G06F 2217/41* (2013.01); *Y02T 10/82* (2013.01)

(58) Field of Classification Search
CPC .......... G06T 19/00; G06T 17/20; G06T 17/00
See application file for complete search history.

(56) References Cited

U.S. PATENT DOCUMENTS 5,253,339 A * 10/1993 Wells et al. .................... 345/426
5,739,818 A    4/1998 Spackman
(Continued)

FOREIGN PATENT DOCUMENTS

CN        1828671 A     9/2006
CN      101339670 A     1/2009
(Continued)

OTHER PUBLICATIONS

Hiroaki Date et al.; "Support System to Design a Shape with Surface Texture Using a Mesh Model"; Information Processing Society of Japan; May 20, 2005; vol. 2005, No. 44, pp. 55-60.
(Continued)

*Primary Examiner* — James A Thompson
*Assistant Examiner* — Tapas Mazumder
(74) *Attorney, Agent, or Firm* — Keneally Vaidya LLP

(57)    ABSTRACT

Surface form data as an object to which a grain is applied is inputted to a data input part. A plane polygon forming part projects a borderline of the surface form data on an x-y plane and changes the borderline to poly-lines to form a two-dimensional polygon mesh having the borderline as an outer edge. A three-dimensional polygon forming part connects together intersections of straight lines extending to a z-axis direction from apexes of the polygon mesh and the original surface form data to obtain a three-dimensional polygon mesh and further make the mesh uniform. A grain forming part obtains an amount of displacement from texture data corresponding to the apex of the three-dimensional polygon mesh through a texture model formed and deformed in a texture model deforming part to set polygon data obtained by connecting together the apexes respectively displaced in normal directions as the surface processed data.

23 Claims, 30 Drawing Sheets

(51) Int. Cl.
*G06F 17/50* (2006.01)
*B29C 33/38* (2006.01)
*B29C 33/42* (2006.01)

(56) References Cited

U.S. PATENT DOCUMENTS

| | | | |
|---|---|---|---|
| 6,504,537 B1 * | 1/2003 | Moreton et al. | 345/423 |
| 2002/0021302 A1 * | 2/2002 | Lengyel | 345/583 |
| 2003/0064801 A1 * | 4/2003 | Breckner et al. | 463/30 |
| 2003/0148802 A1 | 8/2003 | Takahama et al. | |
| 2006/0132488 A1 * | 6/2006 | Lim et al. | 345/428 |
| 2007/0206016 A1 * | 9/2007 | Szymanski et al. | 345/473 |
| 2008/0246766 A1 | 10/2008 | Yokohari et al. | |
| 2009/0201288 A1 * | 8/2009 | Fischer et al. | 345/419 |

FOREIGN PATENT DOCUMENTS

| | | |
|---|---|---|
| JP | 7-241909 A | 9/1995 |
| JP | 11-156674 A | 6/1999 |
| JP | 11-238082 A | 8/1999 |
| JP | 2003-288609 A | 10/2003 |
| JP | 2004-013672 A | 1/2004 |
| JP | 2004-358662 A | 12/2004 |
| JP | 2007-004448 A | 1/2007 |
| JP | 2008-257591 A | 10/2008 |
| WO | WO2007/004448 A1 | 1/2007 |

OTHER PUBLICATIONS

Japanese Office Action for the related Japanese Patent Application No. 2009-207996 dated Jan. 15, 2013.

International Search Report, May 11, 2010.

Notification of First Office Action for Chinese Patent App. No. 201080011527.4 (Aug. 30, 2013) with English language translation thereof.

Notification of Reasons for Refusal for Japanese Patent App. No. 2009-207996 (Sep. 10, 2013) with English language translation thereof.

* cited by examiner

FIG. 4
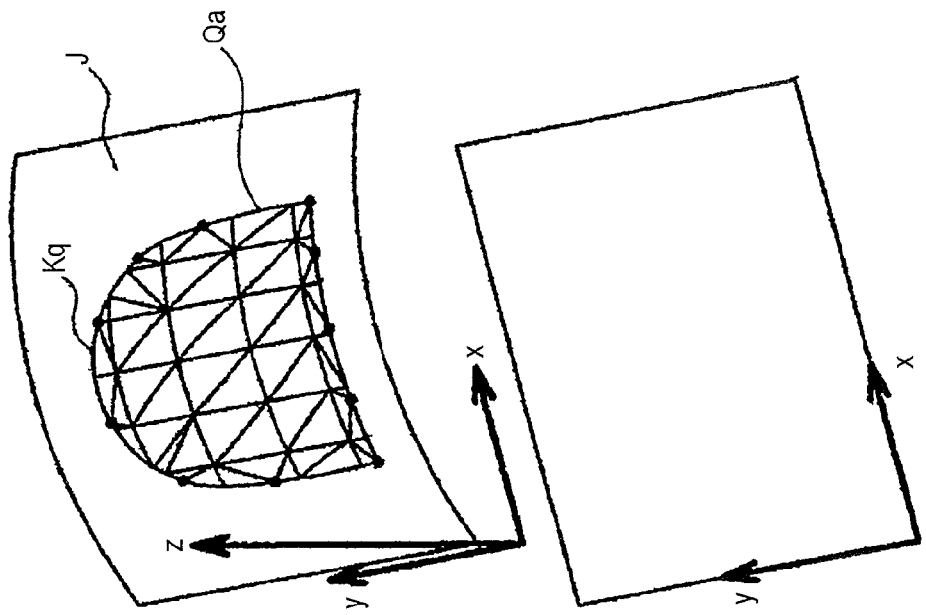
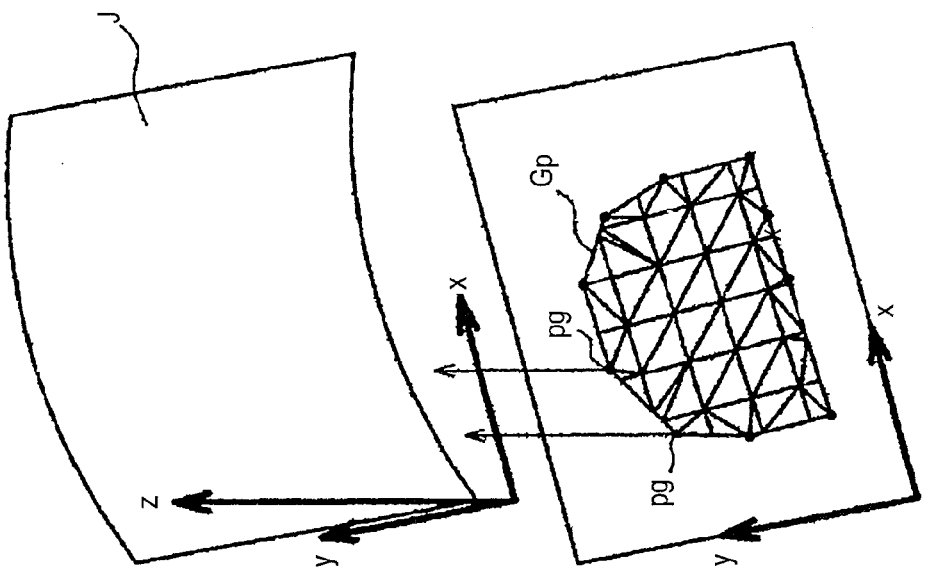

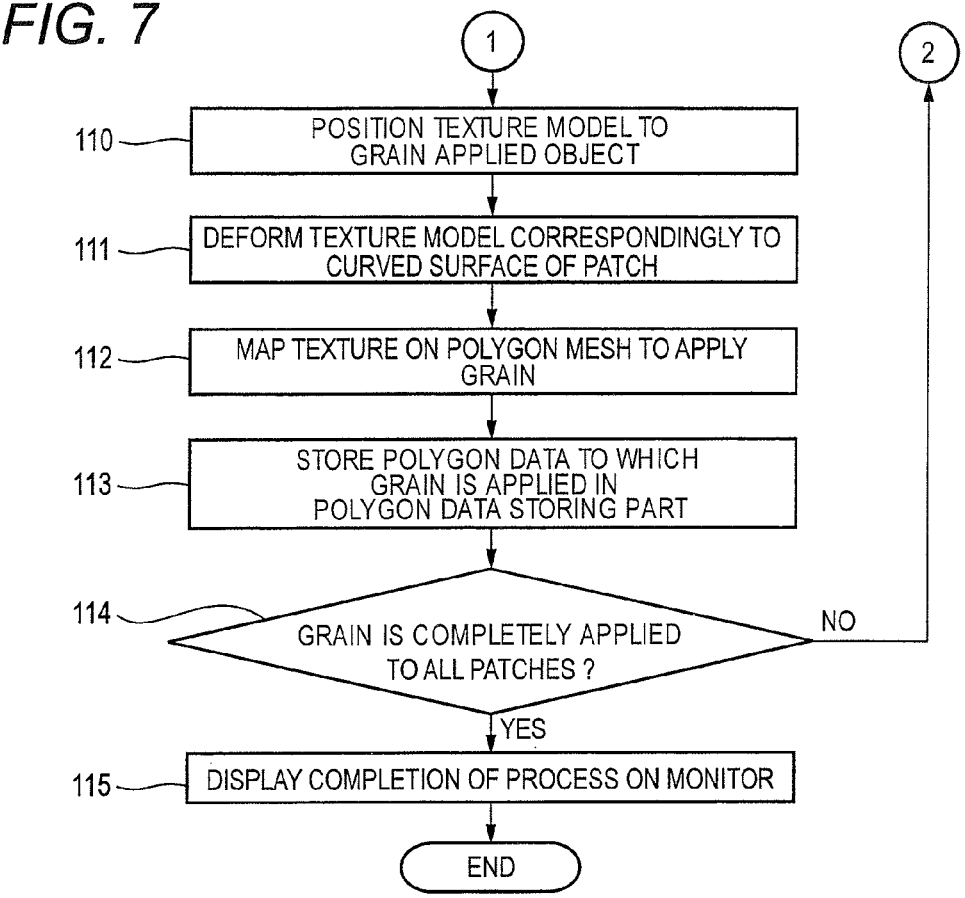
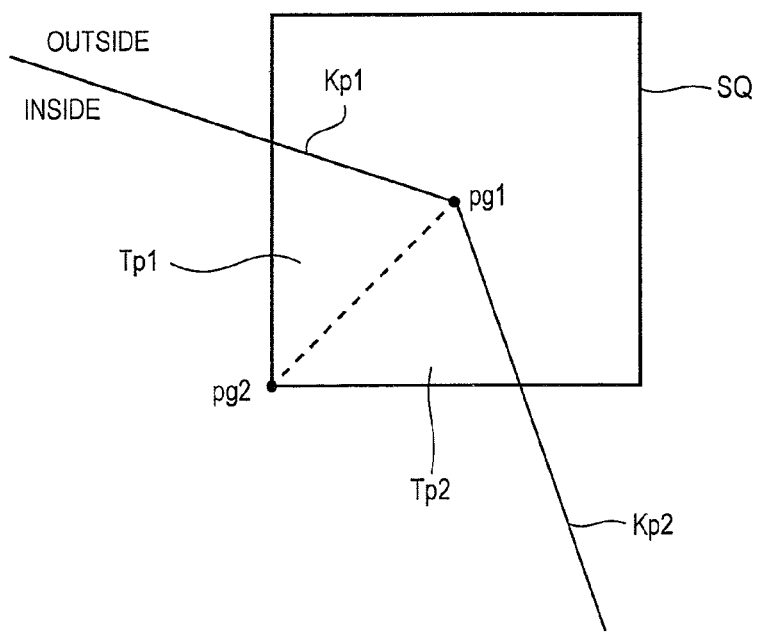

FIG. 9
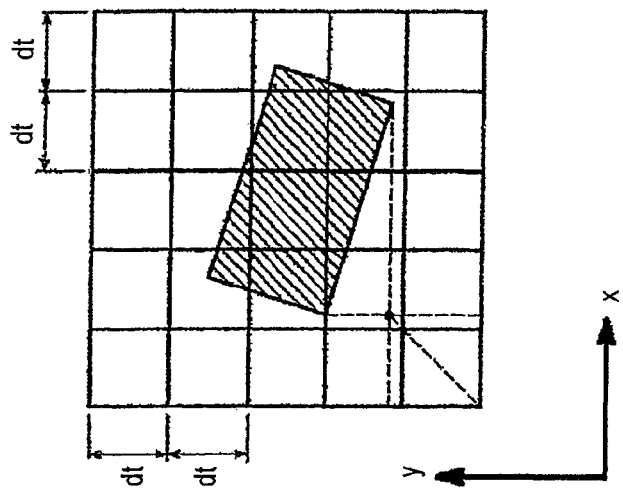
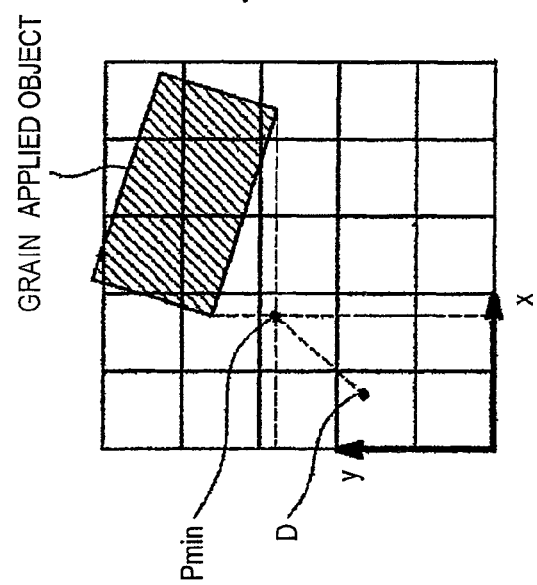

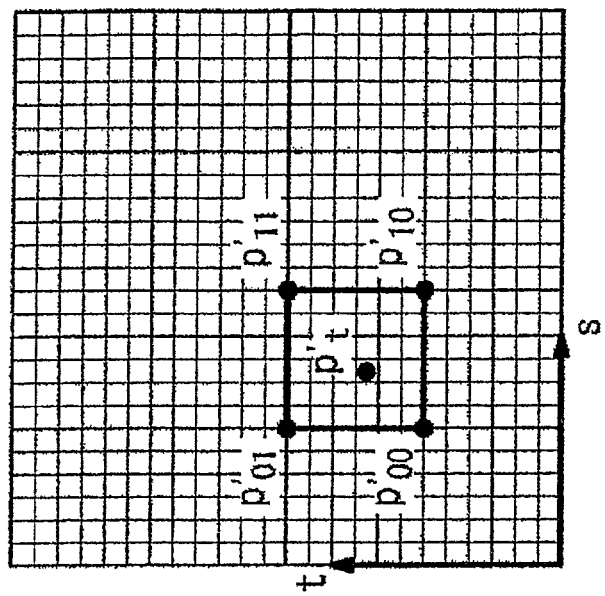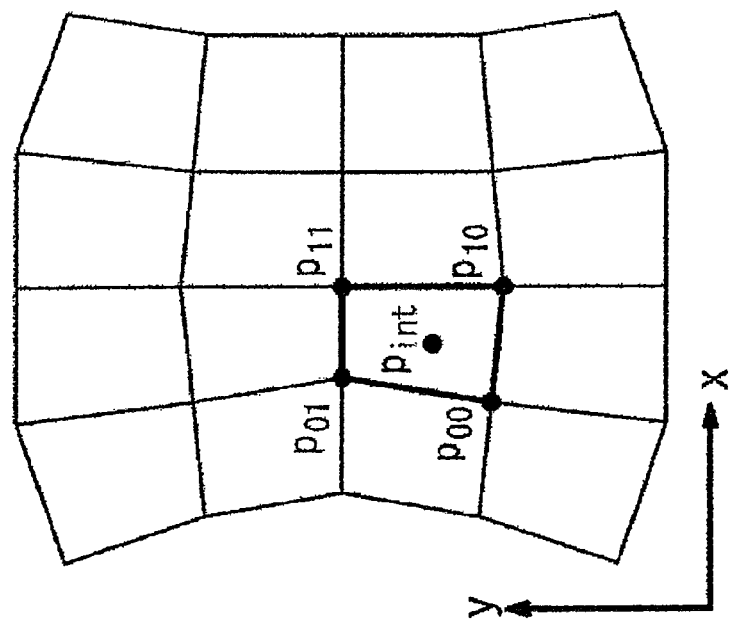
FIG. 15

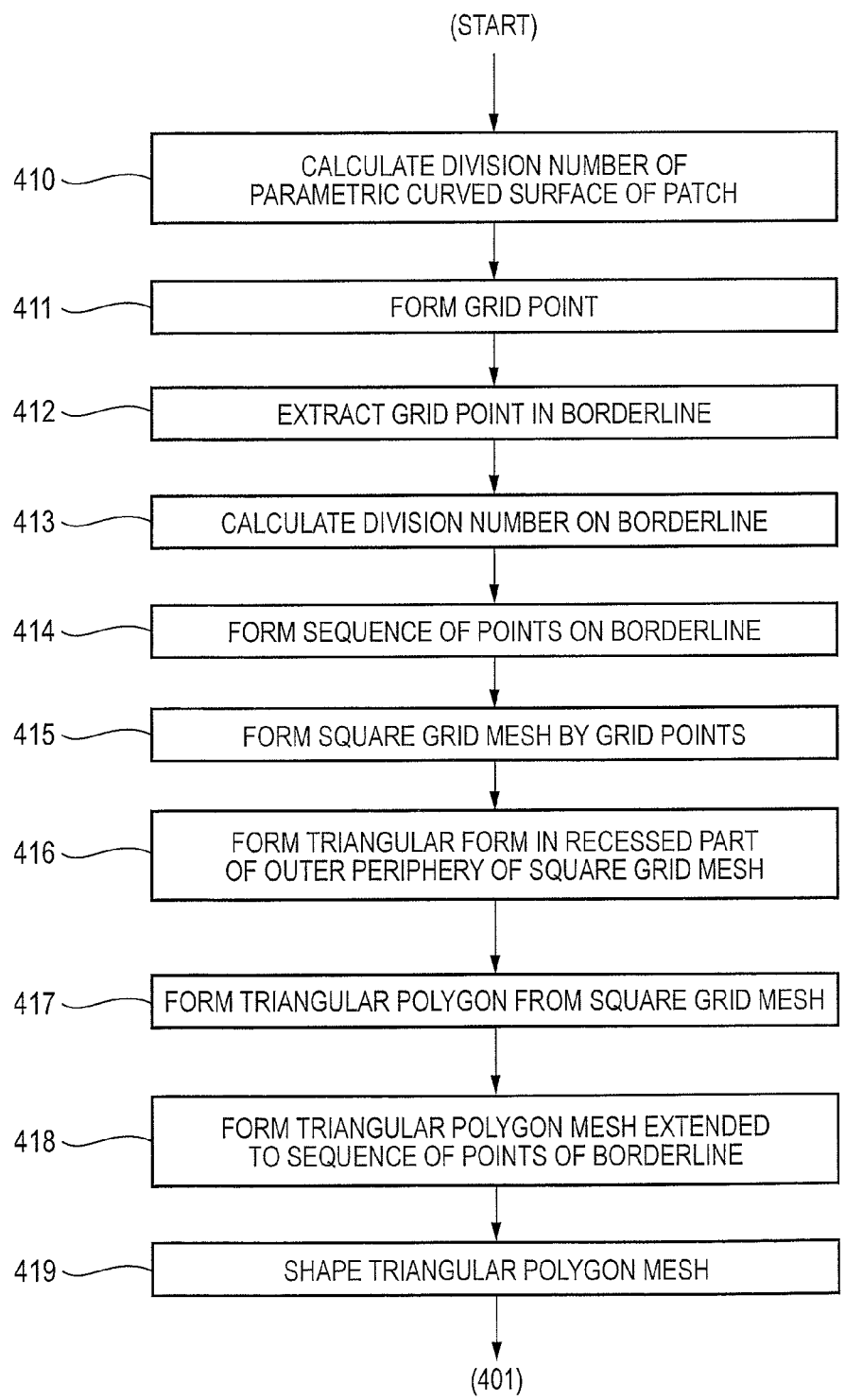

METHOD AND DEVICE FOR FORMING SURFACE PROCESSED

TECHNICAL FIELD

The present invention relates to a method and a device for forming a grain on the surface of a resin product.

BACKGROUND ART

On the surfaces of domestic electric devices or interior devices for motor vehicles, a drawing process is applied for various purposes to improve an outward appearance or a tactile impression, shield a glare and prevent a slip. As a grain, patterns of various fine forms are used such as the textures of leather, grain, rock and pebble, pear-skin lacquer, a geometric pattern, etc. In order to form the grain on the surface of the resin product, the grain is given to a metal mold by an etching method or an electro-casting method.

When the grain is applied to the metal mold by the etching method, since the grain is formed by corrosion, the grain can be inexpensively applied even to the metal mold of a large product. However, a fine form is hardly expressed and the same form is repeatedly manufactured.

Further, when the grain in which irregularities are extended in a normal direction of a curved surface of a product is formed by an injection molding, if what is called an under arises that a product taking out direction intersects the curved surface of the product on a plane along a mold opening direction, the irregularities of the grain of a molded product are caught by the irregularities of the metal mold during a taking out operation of the molded product. At this time, a problem arises that when the molded product is taken out from the metal mold by force, the grain of the molded product is broken. Accordingly, in order to avoid the damage of the grain during a mold opening operation, as a drawing gradient (a supplementary angle of 90° of an angle formed by the normal direction of the curved surface of the product and the product taking out direction) along the mold opening direction comes nearer to 0°, the depth of the grain needs to be the shallower in accordance with the change of the drawing gradient so as to avoid the occurrence of the under. Therefore, the depth of the irregularities of the grain needs to be changed in accordance with the curved surface so that in an area of the curved surface of the product where the drawing gradient is nearer to 0°, the depth of the grain is made to be the shallower.

However, when the grain is applied to the metal mold by the etching method, the depth of the irregularities of the grain cannot be continuously changed. Thus, when an etching process is applied stepwise to change the irregularities, seams thereof are exposed. Accordingly, the seams of the metal mold are transferred to the molded product to deteriorate an outward appearance of the molded product.

On the other hand, when the grain is applied to the metal mold by the electro-casting method, a thin resin sheet having a grain embossed is bonded to the surface of a model manufactured in the form of a product, and an obtained model is taken as a master model to form a molding block via an inversion of resin or an electro-casting process. However, when the resin sheet is stuck to the model of a three-dimensional form, since an elongation or distortion arises, or a misalignment arises in the pattern of the seams, a skill of an operator is necessary in order to correct them so as to make them inconspicuous. Further, many processes are required, so that a term of work is lengthened to increase a cost. Thus, only a specialized maker having a private device can use the electro-casting method. Since the form or size of the grain is determined by the grain of the resin sheet to be stuck during the manufacture of the master model, it is difficult to apply an additional pattern to an arbitrary part after the master model is manufactured or to make a change, for instance, enlarge or reduce the grain.

Further, both the methods have a demerit that a chemical treatment is necessary.

Further, as a technique by which a grain of high quality can be more simply formed, JP-A-7-241909 or JP-A-2004-358662 is known. In this technique, initially, a surface measured value obtained by reading a surface form of a leather model is converted into image data in which the depth of the surface form is represented by the density of 256 gradations to digitize the form data of the grain. In accordance with this digital data, processed data is generated by a computer. By using the processed data, the grain is applied to a plane material such as an embossing roll or an embossing plate, or the grain is applied to a three-dimensional object such as a metal mold by a cutting work or a laser beam machining work.

When the processed data is generated from the form data of the grain, if the grain is merely projected on the surface of the three-dimensional object having a three-dimensional form such as the metal mold from one direction to generate the processed data, irregularities of the grain are elongated in an inclined surface of the three-dimensional object to distort the form of the grain. Accordingly, the grain needs to be formed in a normal direction corresponding to a curved surface relative to a surface of a product having the curved surface.

Therefore, as means that forms a grain in a normal direction of the surface of a product, for instance, a modeling software using a voxel data conversion is provided which stacks voxels on a curved surface of the product to generate the grain in accordance with a density corresponding to the depth of the grain in image data.

In this voxel system, form data of the product is converted to voxel data composed of small balls or cubes to determine a pixel of image data of the grain corresponding to each of the voxel data. Then, the density of the pixel is converted to an amount of displacement to stack the voxels corresponding to the amount of displacement on the voxel data. The stacked voxels are converted to polygon data as final data.

PRIOR ART REFERENCE

Patent Reference

Patent Reference 1: JP-A-7-241909
Patent Reference 2: JP-A-2004-358662

SUMMARY OF THE INVENTION

Problems that the Invention is to Solve

However, since in the above-described system, the dorm data of the product is initially converted to the voxel data, an enormous amount of data is required.

Further, the form data of the grain needs to be generated for each of divided ranges relative to the surface of the product having a con tenuous and complicated form composed of a plurality of curved surfaces, and after the form data of the grain is generated, a seam process is necessary between the form data of the adjacent grains. However, since it cannot yet be said that a throughput of an ordinary computer is sufficient to a load of the seam process, a satisfactory countermeasure is not yet taken for this problem.

countermeasure is not yet taken for this problem.

Namely, since boundaries (seams) of the form data of the grains of the adjacent divided ranges are hardly set to the same forms by the computer, an operator needs to make a correction by a manual operation that requires the large number of processes. Further, the correction by the manual operation causes the forms of the grains of the product which are to be seamed together to be deformed. Accordingly, a workmanship changes depending on a skillfulness of the operator, so that corners are occasionally rounded and grooves or crests are occasionally thickened or bent. As a result, an outward appearance is frequently not good, which misses a primary aim of the correction for forming the grain with good outward appearance without marking the seams of the grains, and the quality of the product is not stabilized. Accordingly, in the actual circumstances, an object to which a usual method is mainly applied is limited to a plane or a cylindrical surface.

Accordingly, by considering the above-described usual problems, it is an object of the present invention to provide a method and a device for forming surface processed data in which a grain is formed that has little distortion in a normal direction of a surface of a product by a simple process without requiring an excessive amount of data. Further, it is an object of the present invention to provide a method and a device for forming surface processed data in which when the data is divided, seams of the forms of grains are smooth. Still further, it is an object of the present invention to provide a method and a device for forming surface processed data in which the depth of a grain is smoothly changed correspondingly to a drawing gradient of a metal mold to form a grain with good outward appearance.

Means for Solving the Problems

Accordingly, in the present invention, product form data as an object to which a grain is applied is replaced by a polygon mesh, each of apexes of the polygon mesh is displaced in a prescribed direction calculated from each polygon mesh sharing the apex in accordance with texture data of the grain, new polygon mesh data is formed in accordance with the apexes respectively displaced in the prescribed directions and the new polygon mesh data is determined as surface processed data to which the grain is applied.

According to the above described structure, an amount of processed data may be reduced by forming the polygon mesh. Further, since the apexes of the polygon mesh are displaced in the prescribed directions in accordance with the texture data of the grain, the grain having a good external appearance can be obtained.

Further, an amount of displacement that the apex of the polygon mesh is displaced is set to an amount of final displacement obtained by multiplying an amount of reference displacement based on the texture data by a reduction ratio of an amount of displacement depending on a drawing gradient of a metal mold, so that the new polygon mesh data can be formed in accordance with each of the displaced apexes.

When the reduction ratio of the amount of displacement is continuously changed, an under does not occur and the depth of the grain can be smoothly changed to obtain a surface of good outward appearance.

The above-described prescribed direction is preferably set to a normal direction. When each of the apexes is displaced in the normal direction, the grain of a good outward appearance having no distortion can be especially obtained.

More specifically, the product form data as the object to which the grain is applied is respectively replaced by the polygon mesh in which the sizes of polygons are uniformed within a prescribed range. The apexes of the polygon mesh are respectively displaced in the normal directions in accordance with the texture data of the grain having coordinates respectively corresponding to the apexes of the polygon mesh. The displaced apexes are connected together to obtain the polygon data of the product form including the grain as the surface processed data.

Since the curved surface data that does not have the thickness is processed to obtain the surface processed data, an amount of data to be treated may be reduced. The sizes of the polygons of the polygon mesh are respectively uniformed so that the grain having little distortion may be obtained. Further, since the apexes of the polygon mesh are respectively displaced in the normal directions in accordance with the texture data, the grain having a good outward appearance can be obtained.

In a replacement of the product form data by the polygon mesh, a borderline as a curved surface forming the product form data is projected on a two-dimensional plane. On the two-dimensional plane, the borderline is changed to poly-lines. A two-dimensional grid mesh that covers the borderline changed to the poly-lines is trimmed by the borderline. The two-dimensional polygon mesh is generated from the trimmed grid mesh. The intersections of straight lines respectively extending in the direction vertical to the two-dimensional plane from the apexes of the two-dimensional polygon mesh and the original product form data are connected to change the two-dimensional polygon mesh to a three-dimensional polygon mesh. The three-dimensional polygon mesh is preferably converged and uniformed so that the sizes are equal and small.

Initially, the polygon mesh is generated on the two-dimensional plane, and then, the polygon mesh is changed to the three-dimensional polygon mesh. Accordingly, a calculating process is simple.

When the borderline is changed to the poly-lines on the two-dimensional plane, the straight line is preferably divided by a maximum division number among division numbers by which the length of all line segments of the poly-lines is larger than the length of a diagonal line of a square grid of the grid mesh.

In a process for forming the poly-lines, as the division number is more increased, the higher approximation to the original borderline may be obtained. However, when the division number is increased so that the line segments of the poly-lines are smaller than the diagonal line of the square grid, a calculation of the line segments and the square grid is complicated. Therefore, when the high approximation of the borderline of the product to the poly-lines and the easy calculation of the intersections of the square grid and the line segments of the poly-lines are taken into consideration, the borderline is preferably divided by the maximum division number among the division numbers by which the length of all the line segments of the poly-lines is larger than the length of the diagonal line of the square grid of the grid mesh.

For instance, when it is assumed that an entire length of the borderline is Length, the line segment of the poly-lines is line, the diagonal line of the square grid is ss and the division number n, n is expressed by n=Length/line. Further, under a condition of line>ss, n<Length/ss is obtained. The maximum division number referred herein means a maximum integer of the division numbers that satisfy an expression of n<Length/ss.

The grid mesh is desirably common to all patches. Especially, when the grid mesh common to all the patches is combined with the formation of the poly-lines by the maximum division number of the division numbers by which the length of all the line segments is larger the length of the diagonal line of the square grid of the grid mesh, the borderlines between the adjacent patches are the same poly-lines and the apexes of seams respectively correspond mutually.

Since the texture data is image data in which the depth of the grain relative to two-dimensional position coordinates is allocated to the gradation of density, the amount of displacement of the apexes of the polygon mesh can be obtained by multiplying the gradations of the densities of the image data by a prescribed conversion rate.

Since the texture data itself can represent the texture by a small amount of data, a data process is simplified.

Further, since the plurality of change equations of the reduction ratio of the amount of displacement are set and may be selected by an operating and input part, the proper depth of the grain-depending on the drawing gradient can be obtained by considering the shrinkage property of a molding material.

Since a texture model having a designated grid space is preferably generated from the texture data and the texture model is preferably deformed correspondingly to the inclination of a curved surface to obtain the gradations of the densities from the texture data in accordance with the coordinates of the positions of the deformed texture model corresponding to the apexes of the polygon mesh.

Thus, the polygon mesh is simply coordinated with the texture data for the purpose of generating the grain having no distortion.

In the replacement of the product form data by the polygon mesh, the borderline of the curved surface of the product is projected on the two-dimensional plane to form the two-dimensional polygon mesh. Then, the two-dimensional polygon mesh can be changed to the three-dimensional polygon mesh. In place thereof, grid points are formed by prescribed division lines in a parameter space of a parametric curved surface, a sequence of points are formed at prescribed intervals on the borderline, and the grid point located inside the borderline and the sequence of points on the borderline may be used to directly form the three-dimensional polygon mesh having apexes respectively located on the parametric curved surface.

At this time, especially, the division lines forming the grid points and the sequence of points on the border line respectively have uniform spaces within a prescribed range, and when the three-dimensional polygon mesh is formed, the grid points located inside the borderline are preferably connected together to form the grid mesh, the grid mesh is preferably changed to the triangular polygons and the grid points on the outer periphery of the grid mesh are preferably connected to the sequence of points on the borderline to form the triangular polygons.

Then, when the product data is divided into a plurality of patches, after the three-dimensional polygon mesh is formed for each of the patches, the polygon meshes of all the patches are integrated to one polygon mesh, and then, the apexes may be respectively displaced in the normal directions in accordance with the texture data of the grain.

Advantage of the Invention

As described above, in the present invention, since the grain is applied by the processes that the product form data is changed to the polygon mesh and the apexes thereof are respectively displaced in the prescribed directions in accordance with the texture data, the surface processed data can be obtained by a small burden for a data process and the grain having a good external appearance with little distortion can be effectively obtained.

BRIEF DESCRIPTION OF THE DRAWING

FIG. 4 is an explanatory view showing a concept that a polygon mesh is formed in a three-dimensional polygon mesh.

FIG. 7 is a flowchart showing a flow of processes in the device for forming the surface processed data.

FIG. 8 is an explanatory view illustrating a way for forming the grid mesh in a polygon.

FIG. 9 is an explanatory view showing a way for moving a texture model.

FIG. 15 is a coordinate transformation of an intersection to a texture coordinate system from a texture model.

FIG. 21 is a flowchart showing a detail for forming a triangular polygon mesh.

MODE FOR CARRYING OUT THE INVENTION

Now, an exemplary embodiment of the present invention will be described below.

First Exemplary Embodiment

Figure 1:
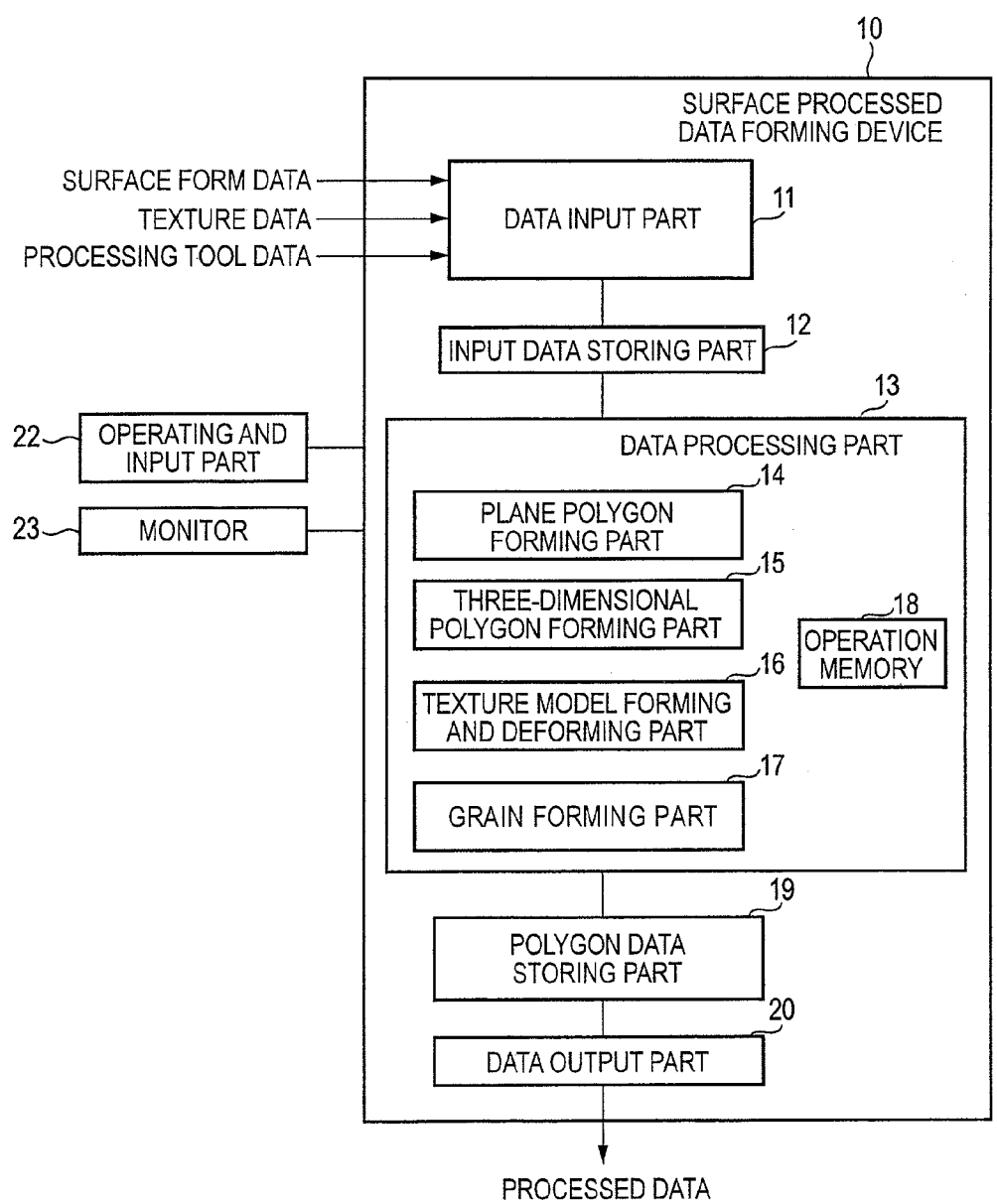
FIG. 1 is a block diagram showing a structure of a device for forming surface processed data in a first exemplary embodiment.

FIG. 1 is a block diagram showing a structure of a device for forming surface processed data according to a first exemplary embodiment.

A surface processed data forming device 10 includes a data input part 11 that inputs a surface form of a product and texture data of a grain and processing tool data, an input data storing part 12, a data processing part 13 that generates polygon data for applying the form of the grain to a curved surface of the product in accordance with the data stored in the input data storing part 12, a polygon data storing part 19 that stores the generated polygon data and a data output part 20 that outputs the polygon data as processed data from the polygon data storing part 19.

To the surface processed data forming device 10, an operating and input part 22 including a keyboard or a jog lever and a monitor 23 which can display image data are connected.

Surface form data as product form data inputted to the data input part 11 is defined as a parametric curved surface in which many coordinates respectively used as CAD data are designated as a function of parameters u and v of S=F (u, v). The surface form data is formed as patch information that is divided into a plurality of curved surfaces by borderlines previously represented by parametric curves and stored in the input data storing part 12. As long as a previous notice is not especially given, the borderlines include what is called a trim line and borderlines having no patch which are adjacent to define an end edge of the form of the product.

The surface form data includes an entire size of an object part of the product to which the grain is applied (refer it to as a grain applied object, hereinafter).

The texture data is two-dimensional gray scale data of 256 gradations in which the depth of the grain is assigned to a density and has a sufficient area size to cover the grain applied object.

The processing tool data includes a space of a grid mesh (refer it to as a grid space, hereinafter) d used for forming a below-described two-dimensional polygon mesh, a grid space dt used for forming a texture model, resolution R of the texture data and a mold opening direction of an injection molding metal mold used for calculating a reduction ratio changed in accordance with a drawing gradient.

The data processing part 13 includes a plane polygon forming part 14, a three-dimensional polygon forming part 15, a texture model forming and deforming part 16, a grain forming part 17 and an operation memory 18.

The plane polygon forming part 14 serves to two-dimensionally form a patch as a previous process to simplify a process for forming a three-dimensional patch in a polygonal patch. As shown in a conceptual diagram of FIG. 2, a borderline K of a patch W in a three-dimensional space is projected on an x-y plane. On this plane, the borderline is changed to poly-lines (replaced by continuous straight lines). The borderline changed to the poly-lines is designated by Kp.

Figure 3A:
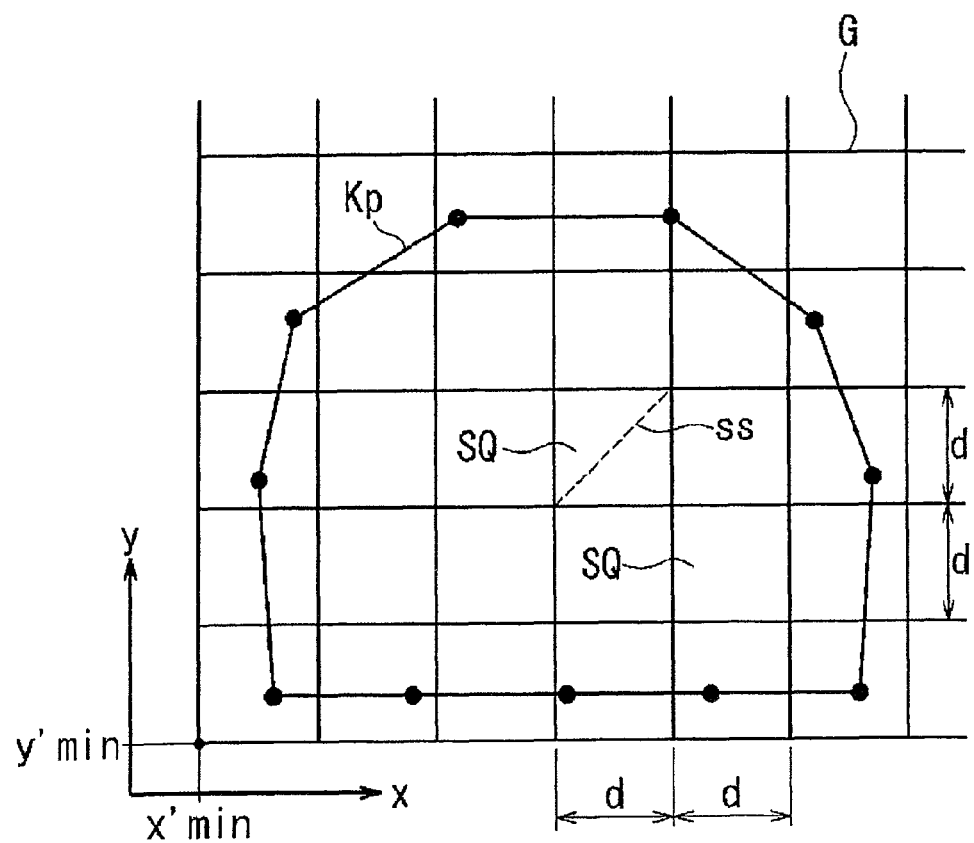
FIG. 3A is an explanatory view of a method for setting a two-dimensional grid mesh.
Figure 3B:
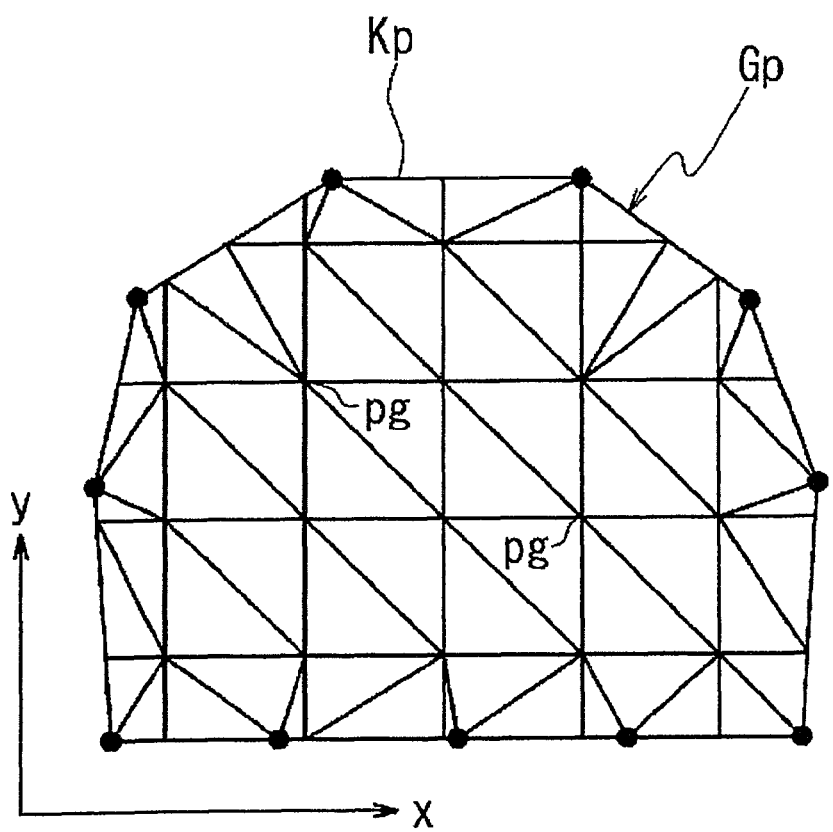
FIG. 3B is an explanatory view of a method for forming a two-dimensional polygon mesh.

In the plane polygon forming part 14, as shown in FIG. 3A, a grid mesh G is set which has such a size as to cover the borderline Kp changed to the poly-lines on the x-y plane. As shown in FIG. 3B, the grid mesh G is trimmed by the borderline Kp to form a two-dimensional polygon mesh Gp.

In the three-dimensional polygon forming part 15, as shown in FIG. 4, intersections of straight lines respectively passing apexes pg of the two-dimensional polygon mesh Gp which are parallel to a z-axis and an original parametric curved surface J are obtained to three-dimensionally form the polygon mesh and obtain a polygon mesh Qa surrounded by a borderline Kq.

Figure 5A:
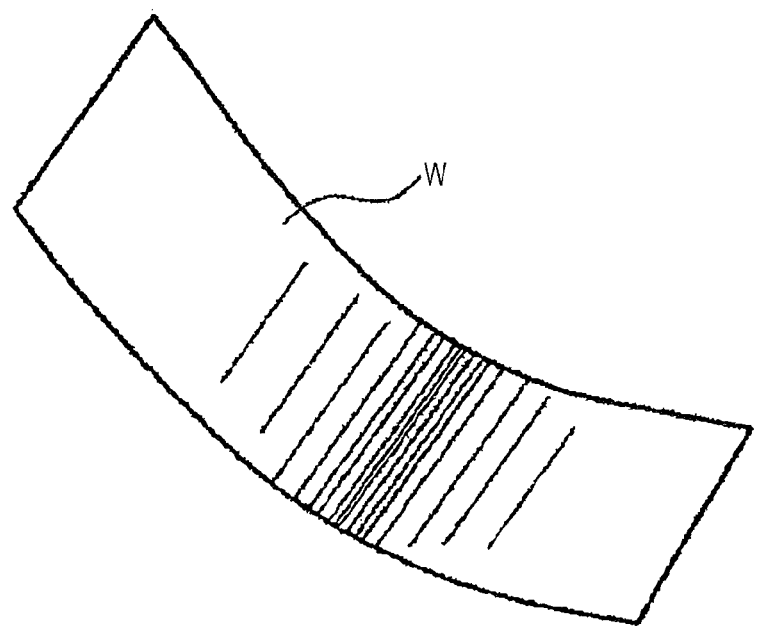
FIG. 5A is an image diagram showing a distorted state of the three-dimensionally formed polygon mesh.
Figure 5B:
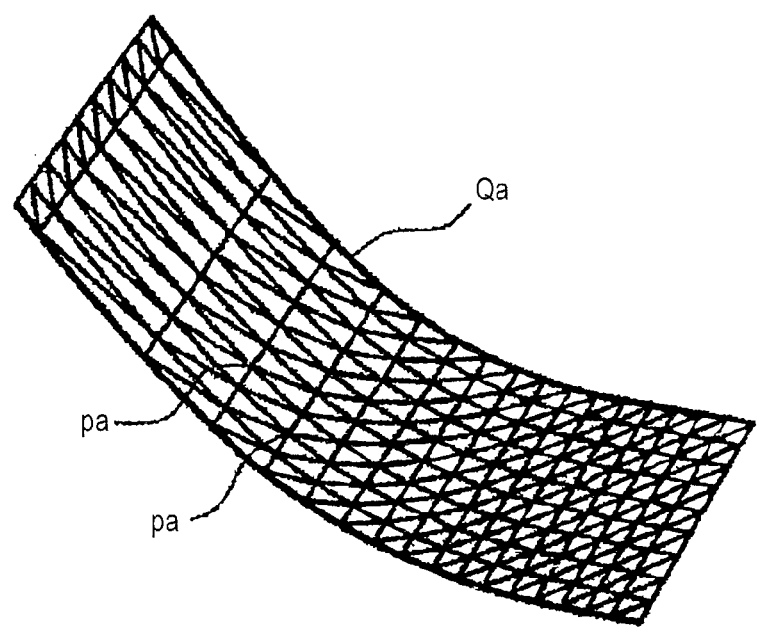
FIG. 5B is an image diagram showing a distorted state of the three-dimensionally formed polygon mesh.

Since the polygon mesh Gp on the x-y plane does not consider the size of a three-dimensionally formed polygon, in the three-dimensionally formed polygon mesh Qa, the grid space is extended in accordance with an inclination of a surface or the mesh is distorted. FIGS. 5A and 5B show image diagrams thereof. For a curved surface form including a standing wall shown in FIG. 5A, in a part corresponding to the standing wall of the polygon mesh Qa as shown in FIG. 5B, the polygon is greatly deformed so that a space between adjacent apexes pa is extended.

Figure 5C:
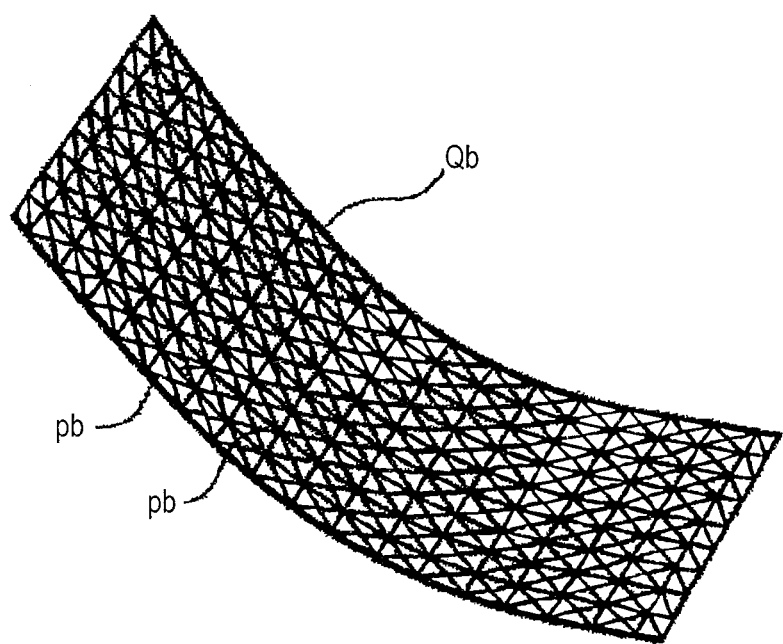
FIG. 5C is an image diagram showing a distorted state of the three-dimensionally formed polygon mesh.

In order to adjust the sizes of the polygons which are not uniform, the three-dimensional polygon forming part 15 further carries out a process for unifying the sizes of the polygons to form a polygon mesh Qb. Thus, as shown in FIG. 5C, spaces between adjacent apexes pb are almost uniform.

The texture model forming and deforming part 16 forms a texture model Tma as a two-dimensional grid mesh on the basis of pixel information of a texture. The coordinates of apexes of the texture model are respectively multiplied by a width of one pixel obtained by the resolution R of the texture data to coordinate obtained texture coordinates with an actual coordinate system and store the texture coordinates in the operation memory 18.

Then, the texture model is deformed so that spaces between the apexes are dense correspondingly to an inclination on the curved surface of the patch W to obtain a texture model Tmb.

This process is carried out, because while the texture, is uniformly arranged on a plane of image data, when the apexes pb of the uniformed polygon mesh Qb are projected on the plane, parts corresponding to inclined surfaces are dense, so that the texture data cannot directly correspond to the apexes.

Thus, the texture model is deformed so that the texture model corresponds to the apexes pb of the polygon mesh Qb projected on the plane. In such a way, the apexes pb of the uniformed polygon mesh Qb can be allowed to correspond to the texture coordinates through the texture model Tmb. A detail will be described below.

The grain forming part 17 obtains the pixel information of the texture stored in the input data storing part 12 through the deformed two-dimensional texture model Tmb to displace the positions of the apexes pb of the three-dimensional polygon mesh Qb by a displacement mapping to generate polygon data of a patch to which the grain is applied.

As for the displacement of the positions of the apexes of the polygon mesh Qb, the reduction ratio of an amount of displacement is applied depending on the drawing gradient of a metal mold to change the amount of displacement and prevent the occurrence of an under during a pattern drawing operation. In the data processing part 13, a plurality of change equations for determining the reduction ratio of the amount of displacement are previously set. Characteristics of molding materials or the form of the product are taken into consideration so that any of the change equations may be selected by an operation of the operating and input part 22.

In the operation memory 18, the processed data respectively in the parts of the data processing part 13 is temporarily stored.

The data processing part 13 stores the polygon data to which the grain is applied in the polygon data storing part 19 and repeats the above-described processes to all patches W forming the surface form data.

On the monitor 23, the progressing states of the processes including images can be respectively displayed.

Now, a detail of the processes in the above-described surface processed data forming device will be described below.

Figure 6:
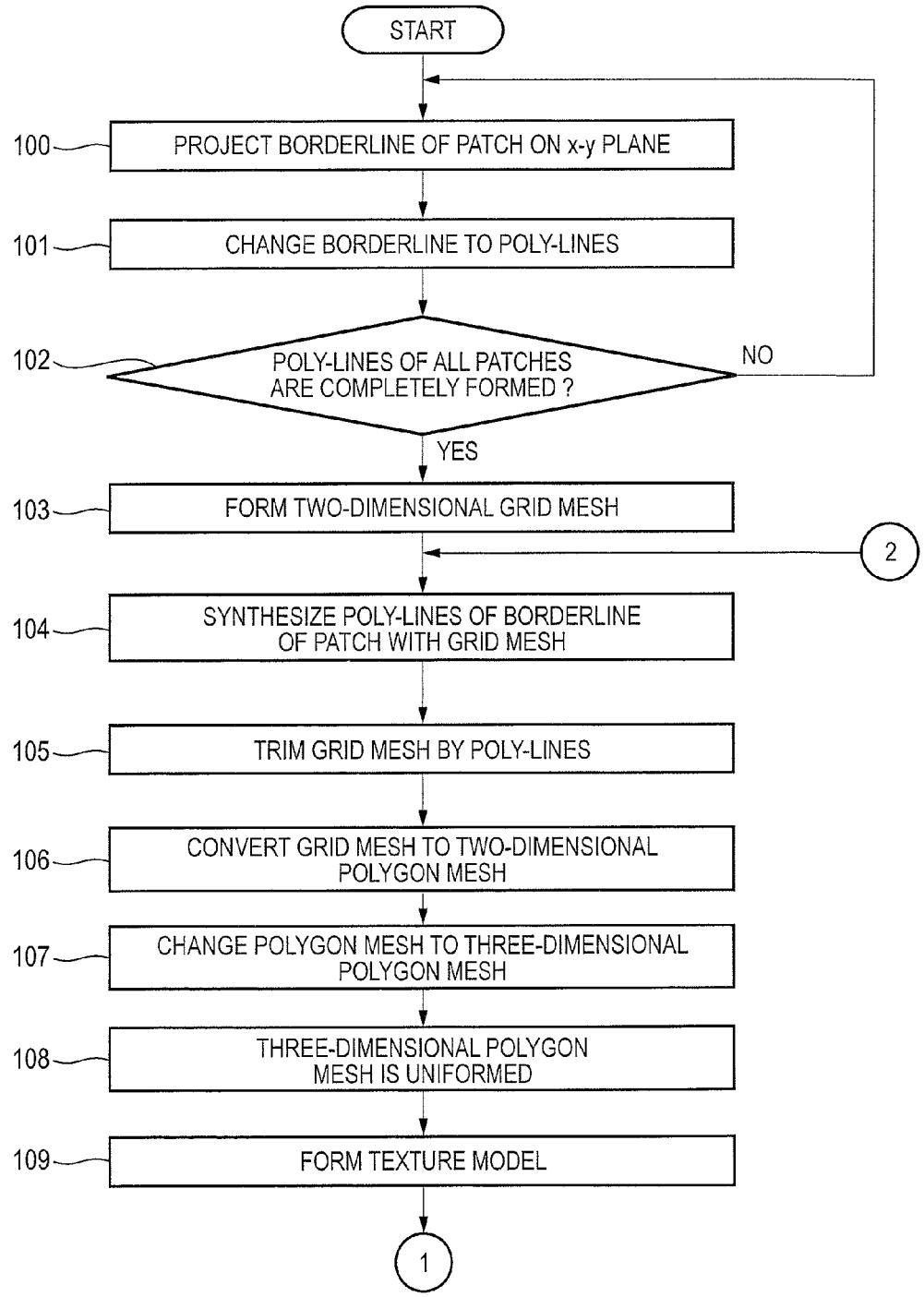
FIG. 6 is a flowchart showing a flow of processes in the device for forming the surface processed data.

FIG. 6 and FIG. 7 are flowcharts showing the flow of the processes.

When the surface form data of the product, the texture data of the grain, the resolution R of the texture data, the grid space dt used for forming the texture model, the space d of the two-dimensional grid mesh and angle information of the mold opening direction are inputted to the data input part 11 by the operation of the operating and input part 22, the data is respectively stored in the input data storing part 12 to start the processes. The change equation for determining the reduction ratio of the amount of displacement is also selected by the operating and input part 22 together with the input of the data.

Figure 2:
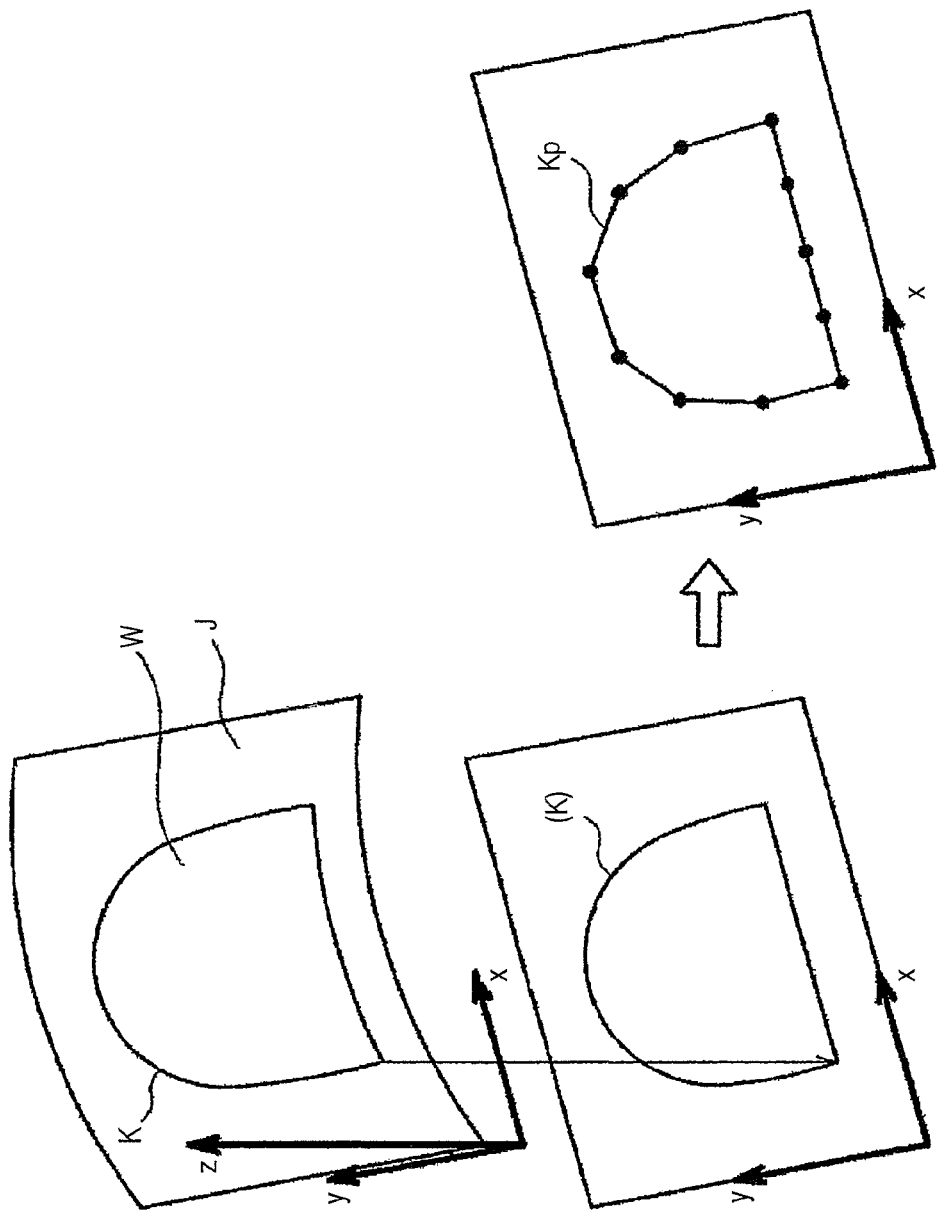
FIG. 2 is an explanatory view showing a concept that a patch borderline is formed in poly-lines.

Initially, in step 100; the plane polygon forming part 14 reads information of the patch W from the input data storing part 12 to project the borderline K of the patch W on the x-y plane as previously shown in FIG. 2.

An order as to which is read from the plurality of patches W stored in the input data storing part 12 is previously set in accordance with stored parts.

In step 101, the plane polygon forming part 14 changes the borderline of the patch W projected on the x-y plane to the poly-lines (replaced by the continuous straight lines) in accordance with the grid space d stored in the input data storing part 12. Here, the borderline K obtained by representing the form data of the product by the parametric curve is divided by straight lines longer than the length of a diagonal line ss of a square grid SQ determined by the grid space d. A detail will be described below.

The borderline Kp changed to the poly-lines is stored in the operation memory 18.

In step 102, the plane polygon forming part 14 checks whether or not patch information that is not processed yet remains in the input data storing part 12, namely, whether or not the borderlines of all the patches are completely changed to poly-lines.

When the plane polygon forming part 14 does not complete a process for changing the borderlines K of all the patches to poly-lines, the plane polygon forming part 14 returns to the step 100 to repeat the above-described processes for a next patch.

When the plane polygon forming part 14 finishes the process for changing the borderlines K of all the patches W to the poly-lines and the patch information which is not processed yet does not remain in the input storing part 12, the plane polygon forming part 14 moves to step 103.

In the step 103, the plane polygon forming part 14 forms the two dimensional grid mesh G which covers the borderlines Kp of all the patches W changed to the poly-lines in accordance with the grid space d.

The grid mesh G has such a size as to cover not only a specific patch projected on the x-y plane, but all the patches W projected on the x-y plane.

Therefore, the plane polygon forming part 14 examines apexes of all the borderlines Kp changed to the poly-lines which are stored in the operation memory 18 to obtain x coordinates and y coordinates and their minimum values $x_{min}$ and $y_{min}$ and their maximum values $x_{max}$ and $y_{max}$ and obtains minimum values $(x'_{min}, y'_{min})$ of the grid mesh which consider an allowable error $\epsilon$ ($\epsilon$>d) from an equation (1) on the basis thereof $$(x'_{min}, y'_{min}) = (x_{min} - \epsilon, y_{min} - \epsilon) \quad (1)$$

$N_x \times N_y$ of the square grids SQ having the spaces d are formed from the minimum values to obtain the grid mesh G shown in FIG. 3A.

Here, $N_x$, $N_y$ are obtained by a below-described equation.

[Mathematical Equation 1]

$$N_x = \left\lfloor \frac{x_{max} + \varepsilon}{d} \right\rfloor \quad (2)$$
$$N_y = \left\lfloor \frac{y_{max} + \varepsilon}{d} \right\rfloor$$

The grid space d of the grid mesh G is common to all the patches W. Since the grid space d is common, the borderline Kp divided by the straight lines under a condition that the minimum values are longer than the diagonal line ss of the grid is the same poly-lines between the adjacent patches and apexes of seams between the patches respectively correspond to each other.

In next step 104, the plane polygon forming part 14 reads the borderline Kp of the one patch W changed to the poly-lines from the operation memory 18 to superimpose and synthesize the borderline on the grid mesh G.

Then, in step 105, the plane polygon forming part 14 trims the grid mesh G on which the borderline Kp is superimposed so that the borderline Kp changed to the poly-lines is an outer edge line.

In step 106, the plane polygon forming part 14 converts the trimmed two-dimensional grid mesh G to a polygon mesh. Here, each square grid SQ of the grid mesh G is divided into triangular polygons. In a division, the square grids SQ are respectively classified for each case and processed one by one by considering a relation to the poly-lines. The triangular polygons are formed by using the apexes of the square grids SQ, the apexes of the poly-lines or intersections of the square grids SQ and the poly-lines according to cases or circumstances.

Since the grid mesh G and the poly-lines exist on the two-dimensional plane, the intersections are simply calculated.

For instance, in an area where the poly-lines do not enter the square grid SQ, the apexes of the triangular polygon may be set to four apexes of the square grid SQ and the square grid SQ may be divided into two triangular polygons.

Further, in an area where the poly-lines traverse the square grid SQ and the apexes of the poly-lines are not included in the square grid SQ, the apexes of the triangular polygon are set to intersections of the square grid SQ and the poly-lines and the apexes of the square grid SQ. One to three triangular polygons are generated depending on whish side of the square grid SQ the poly-lines traverse.

Further, as shown in FIG. 8, when an apex pg1 of poly-lines (Kp1, Kp2) is located in a square grid SQ and one apex pg2 of the square grid SQ is located inside the poly-lines, the one apex pg1 of the square grid is connected to the apex pg2 of the poly-lines as shown by a broken line, so that two triangular polygons Tp1 and Tp2 are formed in a square grid located inside the poly-lines.

At this time, since the length of all line segments of the poly-lines (Kp) is larger than the length of the diagonal line ss (see FIG. 3) of the square grid SQ determined by the grid spaced, three or more of continuous line segments of the poly-lines are restrained from intersecting or being located in the one square grid SQ to simplify the process.

Thus, the polygon mesh Gp as previously shown in FIG. 3B is obtained.

In next step 107, the three-dimensional polygon forming part 15 calculates the intersections of the straight lines respectively passing the apexes pg of the two-dimensional polygon mesh Gp which are parallel to the z-axis and the original parametric curved surface to three-dimensionally form the polygon mesh.

To calculate the intersections, the curved surface is expressed by a below-described equation (3) and the straight lines are designated by $x=c_x$, $y=c_y$ and $z=z(t)$.

[Mathematical Equation 2]

$$S(u, v) = \begin{bmatrix} f(u, v) \\ g(u, v) \\ h(u, v) \end{bmatrix} \quad (3)$$

The coordinates (u, v) of the intersections to be obtained are solutions of a non-linear simultaneous equation (4).

$$F(u,v)=f(u,v)-c_x=0$$

$$G(u,v)=g(u,v)-c_y=0 \quad (4)$$

The above-described equation is solved by a Newton-Raphson method.

The Newton- and Raphson method is a repetitive solution method. An approximate solution of a k+1 th order (uk+1, vk+1) is expressed as described below.

$$u_{k+1}=u_k+\Delta u_k$$

$$v_{k+1}=v_k+\Delta v_k \quad (5)$$

In this case, $\Delta u_k$, $\Delta v_k$ are solutions of a below-described linear simultaneous equation, and when the solutions are a prescribed value or lower that is sufficiently small, the solution is decided to be converged.

[Mathematical Equation 3]

$$\begin{bmatrix} \partial F(u_k, v_k)/\partial u & \partial F(u_k, v_k)/\partial v \\ \partial G(u_k, v_k)/\partial u & \partial G(u_k, v_k)/\partial v \end{bmatrix} \begin{bmatrix} \Delta u_k \\ \Delta v_k \end{bmatrix} = \begin{bmatrix} -F(u_k, v_k) \\ -G(u_k, v_k) \end{bmatrix} \quad (6)$$

When u and v are obtained, actual intersections (x, z) on the curved surface are obtained. The intersections are the apexes pa of the polygon mesh Qa.

In step 108, the three-dimensional polygon forming part 15 makes the three-dimensionally formed polygon mesh Qa uniform. This is a countermeasure for a problem that the sizes of the polygons are not uniform between a part of the three-dimensionally formed polygon mesh Qa substantially parallel to the x-y plane and a part having an angle relative to the x-y plane so that the texture of the fine grain is hardly properly coordinated in a subsequent step.

A uniform process is carried out by applying a spring material point type model. The apexes of the polygon are taken as material points and a side is taken as a spring to displace the apexes pa so that forces respectively acting on the apexes are balanced. In this case, in order to avoid the collapse of an entire form, restricting conditions are provided so that the apexes of corners in the entire form are fixed, the apexes on the borderline move on the borderline and other apexes than the above-described apexes move on the curved surface of an original product form.

Thus, the polygons which are extremely large except a part extending along the borderline become small and apex spaces are converged within a prescribed range to be substantially equal.

Now, a case is considered that n material points are connected to a material point whose position is Pi. When the material point whose position is Pi is connected to a material point whose position is Pj by a spring, assuming that a rate of spring is k, a natural length of the spring is $l_{ij}$, a distance between the two material points is $l'_{ij}$, a force $f_{ij}$ that a material point i receives from a material point j is obtained by a below-described equation (7) in accordance with a Hooke's law. Further, a resultant force Fi of all forces received by the material point i is expressed by an equation (8)

[Mathematical Equation 4]

$$f_{ij} = k(l'_{ij} - l_{ij})\frac{p_j - p_i}{|p_j - p_i|} \quad (7)$$

[Mathematical Equation 5]

$$F_i = \sum_{j=1}^{n} f_{ij} \quad (8)$$

Here, since an acceleration ai of the material point is expressed by $a_i=F_i/m_i$ in accordance with an equation of motion, when the material point i is stationary (initial velocity $v_o=0$), velocity vi after a time $\Delta t$ is expressed by a below-described equation.

$$v_i=a_i\Delta t=(F_i/m_i)\Delta t \quad (9)$$

[Mathematical Equation 6]

Accordingly, a position $p_i^{new}$ of the material point $i$ after a displacement can be obtained by a below-described equation.

$$p_i^{new} = p_i + \frac{1}{2}v_i \Delta t = p_i + \frac{F_i}{2m_i}\Delta t^2 \qquad (10)$$

Here, the natural length $l_{ij}$ of the spring is taken as a distance between the apexes when the three-dimensional polygon mesh which is not yet displaced is projected on the xy plane, values of a mass $m_i$ of the material point, a time interval $\Delta t$ and the rate of the spring k are freely determined.

The above-described processes are repeatedly carried out until the mesh is uniformed.

The coordinate data of the apexes pb of the uniformed three-dimensional polygon mesh Qb is respectively stored in the operation memory 18.

In next step 109, the texture model forming and deforming part 16 initially generates the texture model Tma from the texture data of the grain stored in the input data storing part 12 as a previous process that allows the texture data to correspond to the apexes of the polygon mesh respectively.

When an image of the texture data is composed of M×N (pixels), the texture model forming and deforming part 16 generates the texture model Tma of a grid mesh of M'×N' from an origin of two-dimensional texture coordinates having a width of one pixel set to 1. A space of the grid is set to a designated dt and M' and N' are designated by a below-described equation (11).

[Mathematical Equation 7]

$$M' = \lfloor M/dt \rfloor$$

$$N' = \lfloor N/dt \rfloor \qquad (11)$$

The designated grid space dt may be set to be the same as, for instance, the grid space d of the grid mesh G.

The coordinates of the texture respectively corresponding to apexes of the grid of the texture model Tma at this time are temporarily stored in the operation memory 18. Then, the coordinates of the apexes of the texture model are respectively multiplied by the width of one pixel obtained by the resolution R of the image, so that the coordinates of the apexes can be converted to actual coordinates.

In next step 110, as shown in FIG. 9, when a minimum point of an x-y coordinate of the grain applied object which is projected on the x-y plane is $p_{min}$ ($x_{min}$, $y_{min}$), the texture model forming and deforming part 16 applies a correction of ($p_{min}$–D) respectively to the apexes of the texture model. Thus, the texture model forming and deforming part 16 moves the texture model Tma to a position where an entire part of the grain applied object on the x-y plane can be covered.

D designates a two-dimensional coordinate to prevent a state that the texture model does not exist in a position where the grain applied object is projected on the x-y plane with a margin estimated when the texture model Tma is deformed in a next step.

In step 111, the texture model forming and deforming part 16 uses the same spring material point type model as that used for making the polygon mesh Qa uniform in the step 108 to deform the texture model Tma by allowing the texture model to correspond to the curved surface of the patch W.

Namely, the apexes of each polygon of the texture model Tma are taken as material points and a side is taken as a spring.

Further, a natural length of the spring is determined in such a way as described below. Initially, it is decided whether both endpoints of the spring are located inside or outside the borderline Kp projected on the x-y plane of the patch W corresponding to the grain applied object of the product and changed to the poly-lines.

When both the endpoints are not decided to be located inside the borderline, a distance between the two points is directly set to the natural length.

When both the endpoints are decided to be located inside the borderline, the texture model forming and deforming part 16 obtains intersections of straight lines respectively passing the endpoints which are parallel to the z-axis and the patch W. When it is assumed that a distance between the two obtained intersections is $l_{3D}$, and a distance between both the endpoints is $l_{2D}$, the natural length l is obtained by an equation (12).

[Mathematical equation 8]

$$l = l_{2D}^2 / l_{3D} \qquad (12)$$

As restricting conditions, in order to prevent the parallel movement or the rotation of an entire part of the texture model Tma, for instance, the texture model forming and deforming part 16 fixes an apex $p_{min}$ having minimum x, y coordinates and controls an apex $p_{max}$ having maximum x, y coordinates to move on a straight line passing the apexes $p_{min}$ and $p_{max}$. Under such conditions, the texture model and deforming part 16 displaces the apexes similarly to the step 108.

Figure 10A:
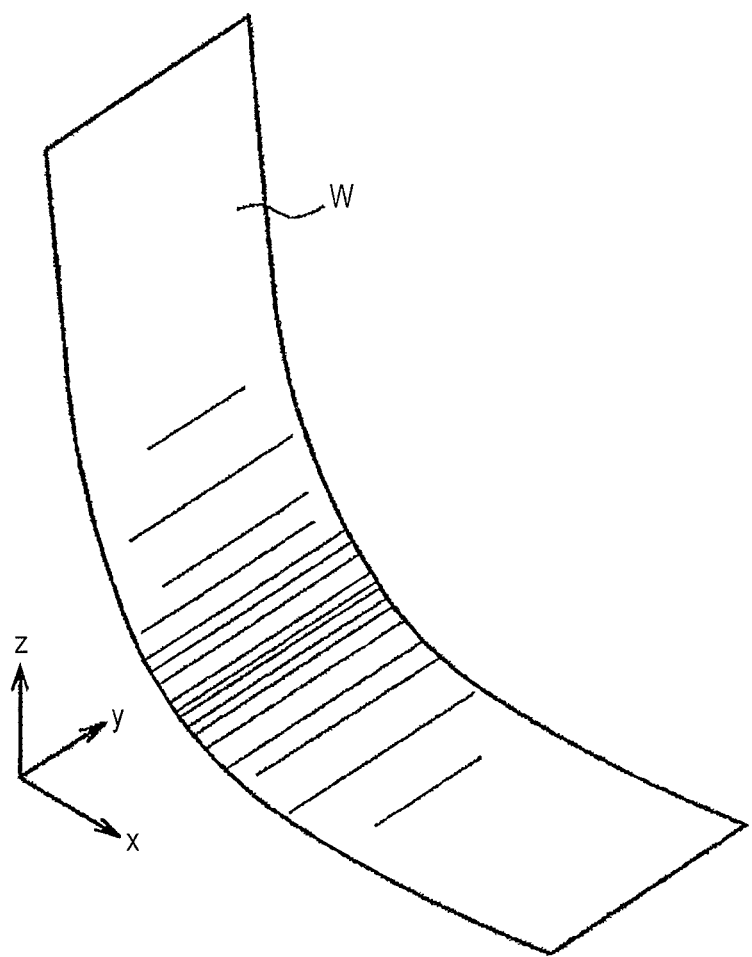
FIG. 10A is a diagram showing a state before the texture model is deformed.
Figure 10B:
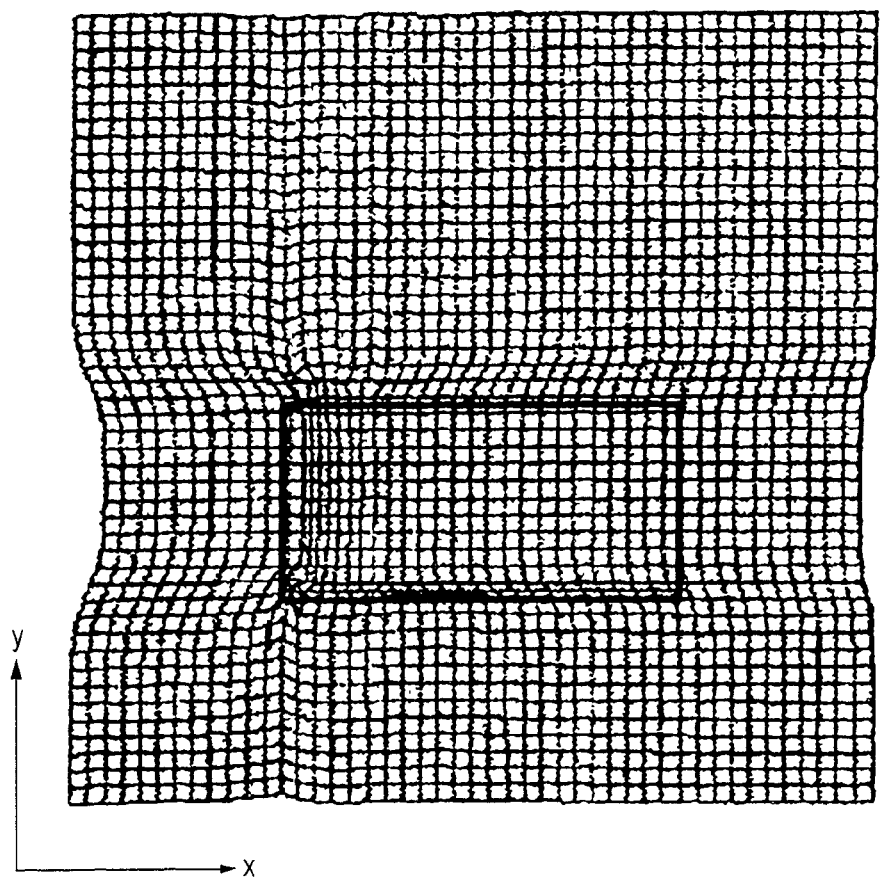
FIG. 10B is a diagram showing a state before the texture model is deformed.

FIG. 10B shows the deformed texture model Tmb relative to a curved surface of the patch shown in FIG. 10A. Here, a thick frame in the drawing shows the borderline of the patch W in FIG. 10A which is projected on the x-y plane (here, a plane of the texture model). In the deformed texture model Tmb, polygons of a part corresponding to an inclined standing wall part are dense relative to the plane of the texture model of the patch W.

Figure 11A:
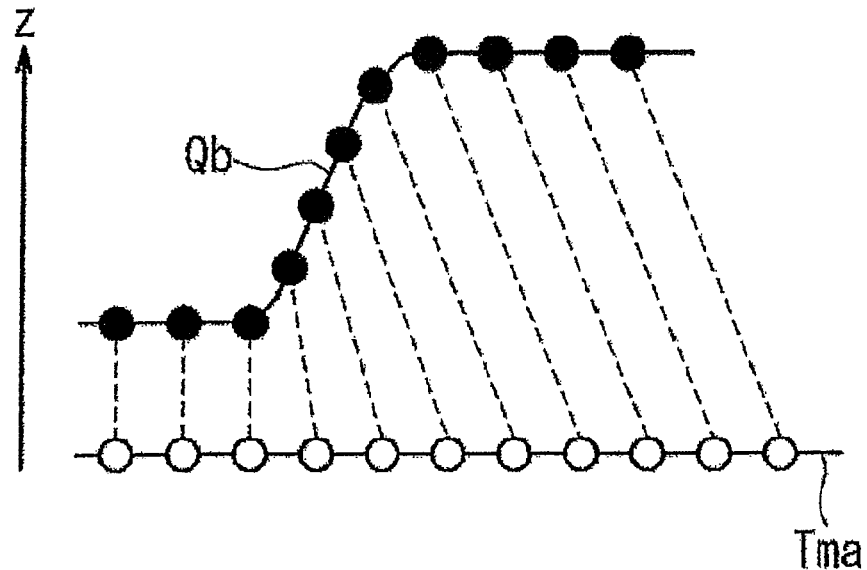
FIG. 11A is a diagram showing a coordinated relation between the deformation of the texture model and the polygon mesh.
Figure 11B:
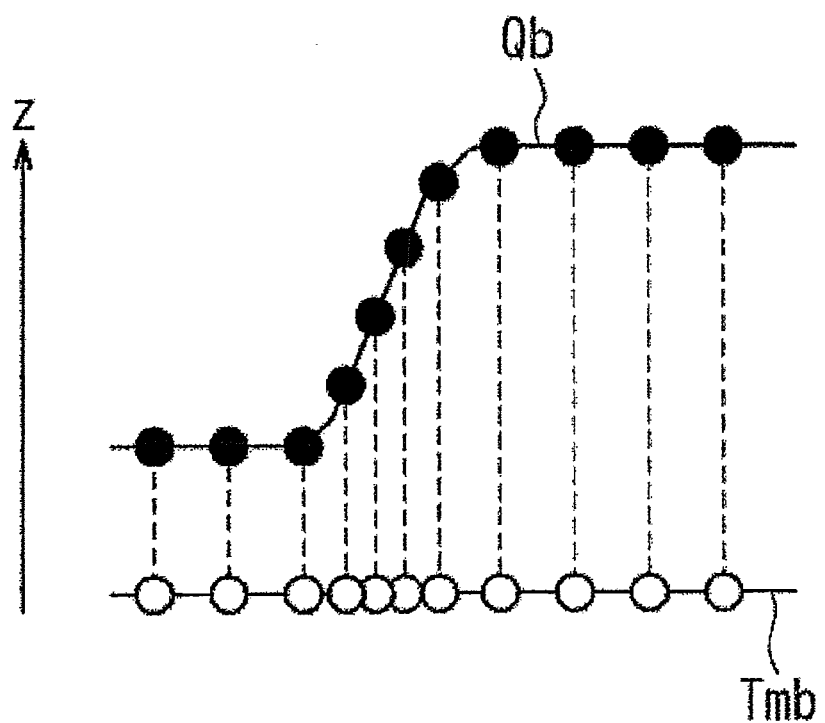
FIG. 11B is a diagram showing a coordinated relation between the deformation of the texture model and the polygon mesh.

In accordance with the deformation of the texture model, a state of FIG. 11A that grid apexes of the corresponding texture model Tma shown by white circles are two-dimensionally and uniformly arranged relative to the apexes (pb) of the polygon mesh Qb uniformed in the step 108 which are shown by black circles is changed to a state, as shown in FIG. 11B, that when the grid apexes of the texture model are projected in the direction of the z-axis (namely, in the direction vertical to the two-dimensional plane), apex intervals of the polygon mesh Qb and the texture model Tmb respectively correspond mutually.

After that, in step 112, the grain forming part 17 applies the grain to the three-dimensional polygon mesh Qb by the displacement mapping. Subsequently, in step 113, the polygon data to which the grain is applied is stored in the polygon data storing part 19.

Thus, the processes of the patch W related to one borderline data read from the operation memory 18 are finished.

In step 114, the grain forming part 17 checks whether or not the borderline Kp (the poly-lines) of the patch W which is not yet processed remains in the operation memory 18, namely, whether or not the grain is completely applied to the polygon meshes Qb of all the patches.

When a process for applying the grain to all the patches W is not completed, the process is returned to the step 104 to repeat the above-described flow in a next patch W.

When the processes of all the patches W the data of the borderlines Kp of which is stored in the operation memory 18 are completed, in step 115, the completion of the processes is displayed in the monitor 23 to finish the processes.

After that, the data output part 20 can output the polygon data stored in the polygon data storing part 19 to a processing device as the processed data by the operation of the operating and input part 22.

Now, a detail of a process for changing the borderline of the patch to the poly-lines in the above-described step 101 will be described below. Here, as one example of the parametric curve forming the borderline, a case will be described that one borderline is defined by a B-spline curve.

A knot designates a value of a parameter in a connecting point. The B-spline curve is defined by a control point {Pi} and a sequence of knots (knot vector) {ti}.

An nth order B-spline curved composed of L segments is expressed by an equation (13) on the basis of the control point {Pi}.

[Mathematical Equation 9]

$$P(t) = \sum_{i=0}^{n-L-1} P_i N_i^n(t) \tag{13}$$

An range where the parameter t moves extends from $t_n$ to $t_{n+L}$.

[Mathematical Equation 10]

Here, $N_i^n(t)$ is expressed by a below-described equation by an nth order *B-spline* basic function $$N_i^n(t) = \frac{t - t_i}{t_{i+n} - t_i} N_i^{n-1}(t) + \frac{t_{i+n+1} - t}{t_{i+n+1} - t_{i+1}} N_{i+1}^{n-1}(t) \tag{14}$$

$$N_i^0(t) = \begin{cases} 1 & \text{where } t \in [t_i, t_{i+1}] \\ 0 & \text{where } t \notin [t_i, t_{i+1}] \end{cases}$$

The process for changing the borderline to the poly-lines is carried out by sequentially dividing the B-spline curve thereof.

Namely, the B-spline curve is divided by taking P(t) in some parameters t of the B-spline curve as apexes and the apexes are connected together by straight lines in order of t of small values. Here, a range from is to te where the parameters t move is divided by a maximum division number among division numbers by which the length of all line segments of the poly-lines is larger than the length of the diagonal line ss of the square grid SQ determined by the grid space d.

Figure 12:
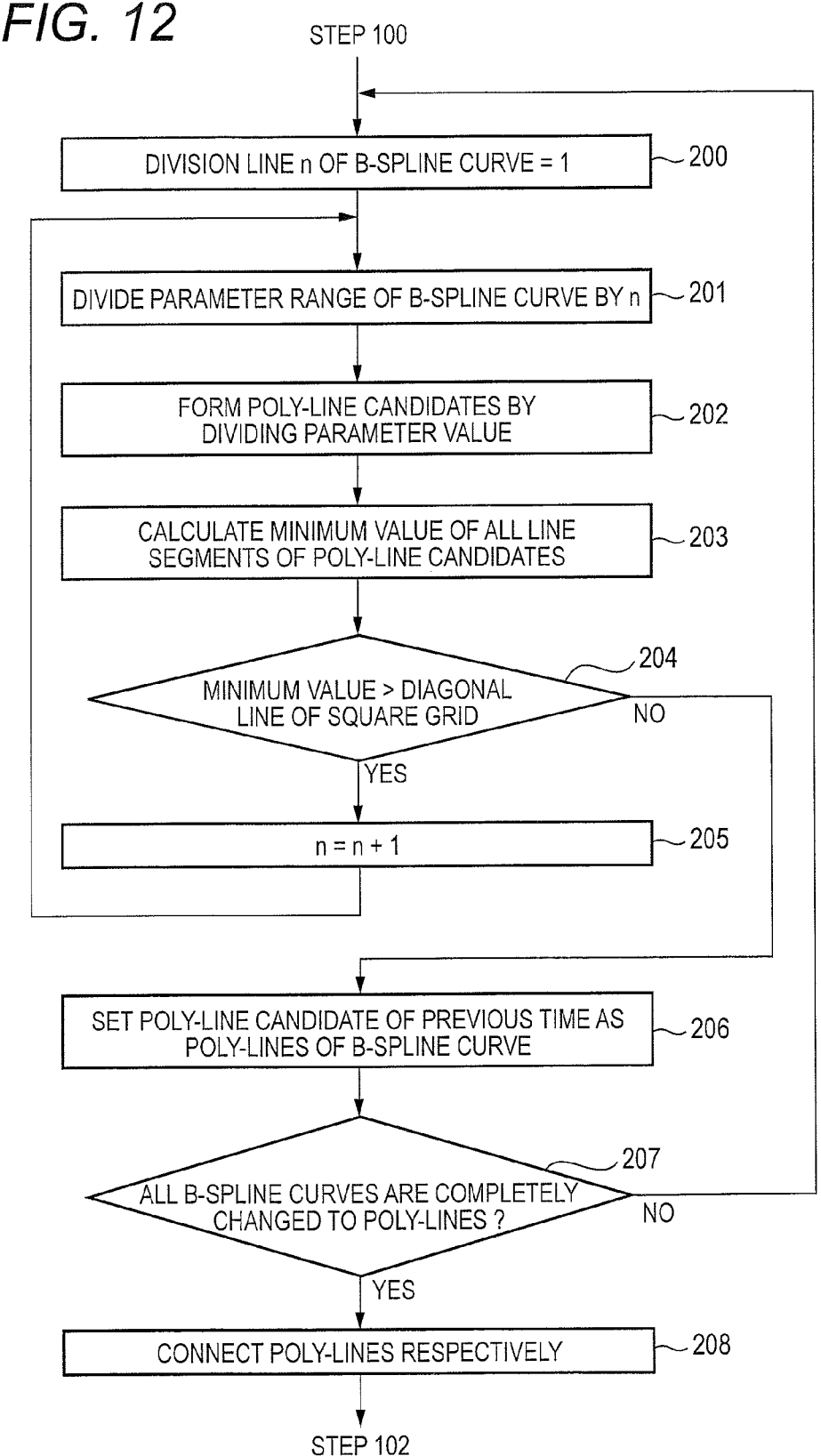
FIG. 12 is a flowchart showing a detail of a process for forming the patch borderline in the poly-lines.

FIG. 12 is a flowchart showing a detailed flow of processes for changing the borderline to the poly-lines.

Initially, in step 200, one B spline curve is set as an object to be divided by designating a prescribed position as an origin from a plurality of B-spline curves forming the borderline K projected on the x-y plane and a division number n thereof is set to an initial value 1.

In step 201, at value is obtained by dividing the range from ts to te where the parameters t move in a B-spline curve equation by n.

Then, in step 202, P(t) (=apex positions) to the t values are respectively calculated to connect the apexes respectively by straight lines and form poly-line candidates.

For instance, when n=2, the t values are expressed by t=ts, (ts+te)/2 and te, so that three points of P(ts), P((ts+te)/2) and P(te) are apexes.

When the division number n is further increased, the lengths of the straight lines which connect the apexes together are sequentially shortened.

In step 203, a minimum value of the length is obtained from all line segments (straight lines) of the poly-line candidates.

In step 204, it is checked whether or not the minimum value of the length obtained in the previous step is larger than the length of the diagonal line of the square grid.

When the minimum value is larger than the length of the diagonal line, the process advances to step 205 to increment the division number n and then returns to the step 201.

When the division number n is increased, as described above, the length of the straight lines for connecting the apexes together is shortened.

In the check of the step 204, when the minimum value of the straight lines is the length of the diagonal line of the square grid or smaller, the process advances to step 206 to set the poly-line candidate of the flow of a previous time to the poly-lines. Namely, when the division number in the flow of this time is n=4 and the minimum value is the length of the diagonal line of the square grid or smaller for the first time, the poly-line candidate when the division number is n=3 is set to the poly-lines of the B-spline curve as an object at present.

However, when the minimum value of the straight line is the length of the diagonal line of the square grid or smaller in a first flow (n=1) of the B-spline curve, the division number is set to n=1 as it is, that is, both endpoints of the B-spline line are connected together by a straight line to form the poly-line.

After that, in step 207, it is checked whether or not all the B-spline curves forming the borderline K are completely changed to the poly-lines.

When the B-spline curve which is not yet changed to the poly-lines remains in the plurality of B-spline curves forming the borderline K, the process returns to the step 200 to repeat the process for changing a next B-spline curve to the poly-lines.

When the process for changing all the B-spline curves to the poly-lines is completed, in step 208, the apexes of the poly-lines at end points of the adjacent B-spline curves are respectively sequentially allowed to correspond and connected together to finish the process for changing the borderline to the poly-lines.

Now, a detail of a process will be specifically described for applying the grain to the three-dimensional polygon mesh by the displacement mapping in the step 112.

A curved surface p' displaced by the displacement mapping is expressed by an equation (15).

$$P'(u,v) = p(u,v) + h(u,v)q(u,v) \tag{15}$$

Figure 13:
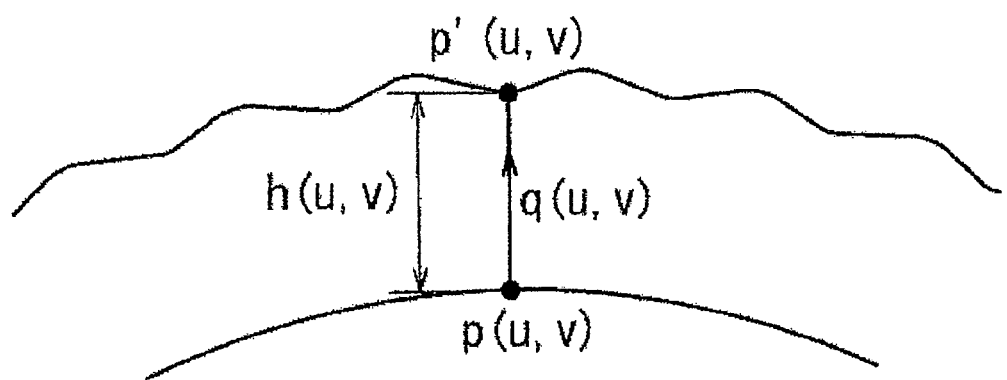
FIG. 13 is an explanatory view showing a concept of a displacement mapping process.

Here, as shown in FIG. 13, p(u, v) designates a curved surface (a basic curved surface) before a displacement, h(u,v) designates an amount of displacement and q(u,v) designates a unit vector of a direction for displacement.

Accordingly, herein, the apexes pb located at positions of p(u,v) in the polygon mesh Qb are displaced by the above-described equation.

Figure 14:
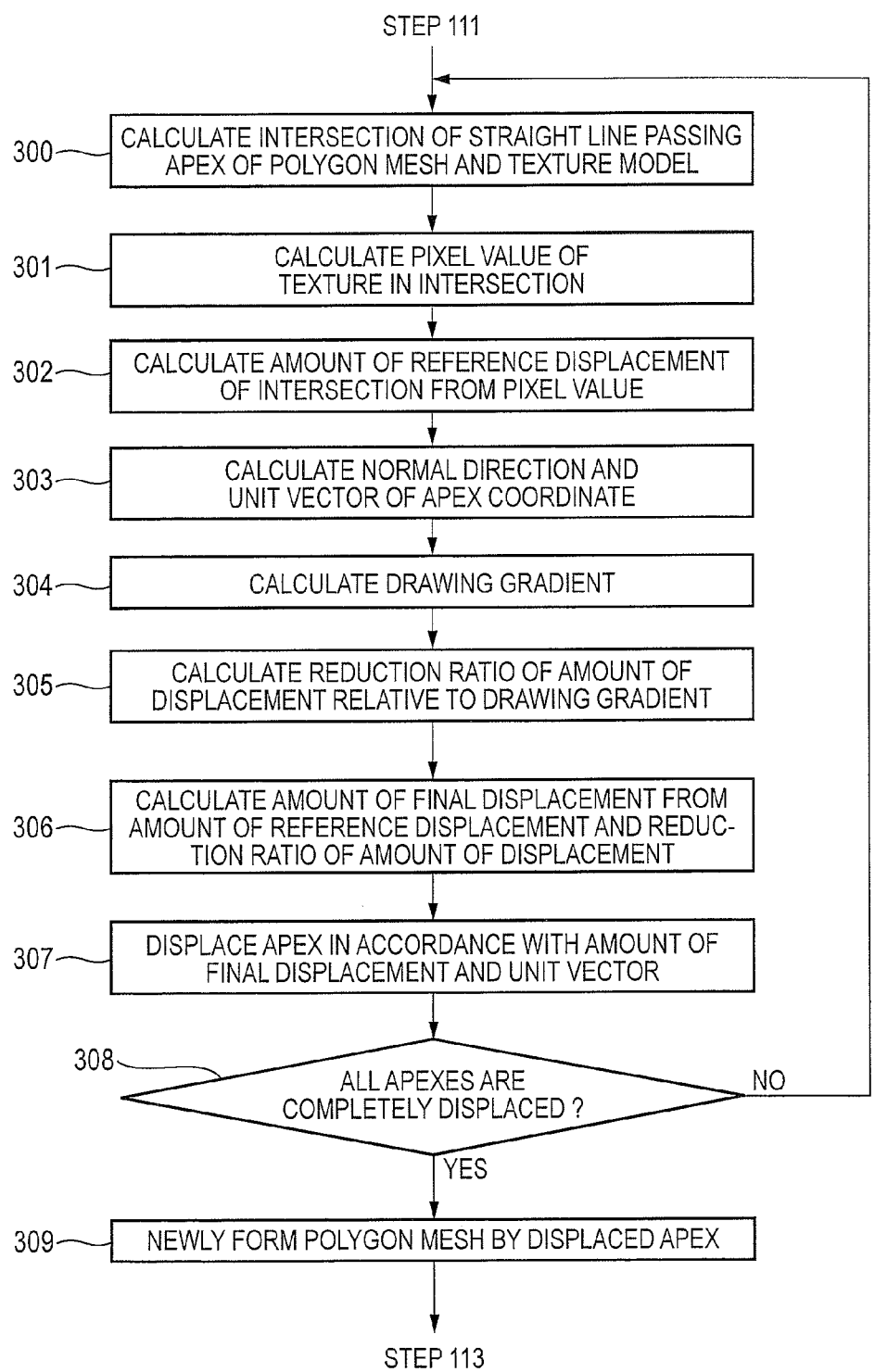
FIG. 14 is a flowchart showing a detail of the displacement mapping process.

FIG. 14 is a flowchart showing a flow of the displacement mapping.

Initially, in step 300, the coordinate data of the apexes pb of the polygon mesh Qb is read from the operation memory 18 to obtain intersections pint of straight lines respectively passing the apexes and parallel to the Z-axis and square polygons of the texture model Tmb.

Here, a curved surface S(u, v) showing the square polygon of the texture model is expressed by an equation (16) by designating the apexes thereof as $p_{00}$, $p_{10}$, $p_{11}$ and $p_{01}$.

$$S(u,v) = (1-u)(1-v)p_{00} + (1-u)vp_{01} + u(1-v)p_{10} + uvp_{11} \tag{16}$$

Since S(u, v) is an infinitely extending curved surface, it is decided whether or not obtained u and v are expressed by $0<=(u,v)=<1$. When the above-described relation shows YES, the square polygon intersects the straight lines.

To which parts of the texture the intersections correspond is calculated by using u and v at that time. Here, the coordinates of the apexes of the coordinate system of the texture are used that are temporarily stored in the operation memory 18 in the step 109.

As shown in FIG. 15, when it is assumed that coordinate points of the texture coordinate system respectively given to the apexes $p_{00}$, $p_{10}$, $p_{11}$ and $p_{01}$ of the square polygon having the intersections are $p'_{00}$, $p'_{10}$, $p'_{11}$ and $p'_{01}$, coordinate points pt (u, v) of the texture corresponding to the intersections can be obtained by an equation (17).

$$pt(u,v)=(1-u)(1-v)p'_{00}+(1-u)vp'_{01}+u(1-v)p'_{10}+uvp'_{11} \quad (17)$$

In step 301, pixel values (density) g of the texture at the coordinates of the intersections are obtained by a bilinear interpolation from pixel values of four pixels in the periphery thereof.

In step 302, in accordance with a conversion rate of the pixel value and the depth (a height from the basic curved surface) of the grain, an amount of reference displacement of the intersections is obtained. Assuming that a maximum depth of the grain, that is, an amount of maximum displacement is $h_{max}$, in the texture data, the conversion rate is $h_{max}/255$ when gray scale image data having 256 gradations is used in which the depth of the grain is allocated to the densities. The amount of reference displacement h is expressed by an equation (18) from the pixel value g.

$$h=g/255*h_{max} \quad (18)$$

For instance, when $h_{max}$ is 300 μm, if the pixel value g is 128, the amount of reference displacement h is 150 μm.

In subsequent step 303, a normal direction of the apex coordinate of the polygon mesh Qb is calculated. Here, as for one apex pb, the normal direction is obtained as an average of the normal directions of the polygons including the apex. At that time, the average is preferably obtained by considering areas of the polygons respectively. This normal direction serves as the unit vector q when the apex is displaced afterward and the drawing gradient is calculated. In step 304, the drawing gradient is calculated in accordance with the mold opening direction of the metal mold as an object to be processed and the normal direction of the apex coordinate. The mold opening direction and the normal direction of the apex coordinate are previously set and stored in the input data storing part 12. Then, in step 305, the reduction ratio of the amount of displacement in the apex position is obtained in accordance with the change equation selected when the process is started.

Figure 16:
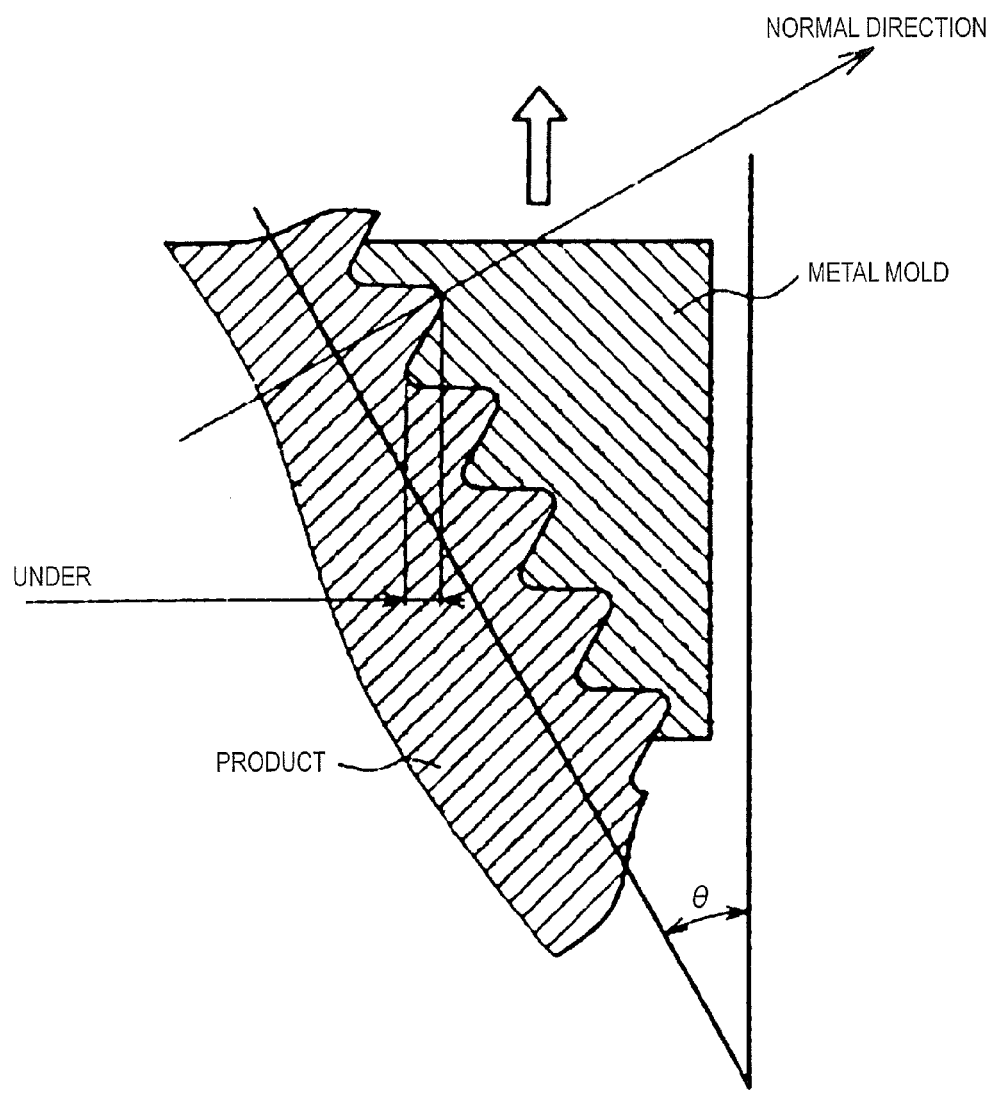
FIG. 16 is an explanatory view showing an interference of a metal mold and a product due to a drawing gradient.
Figure 17:
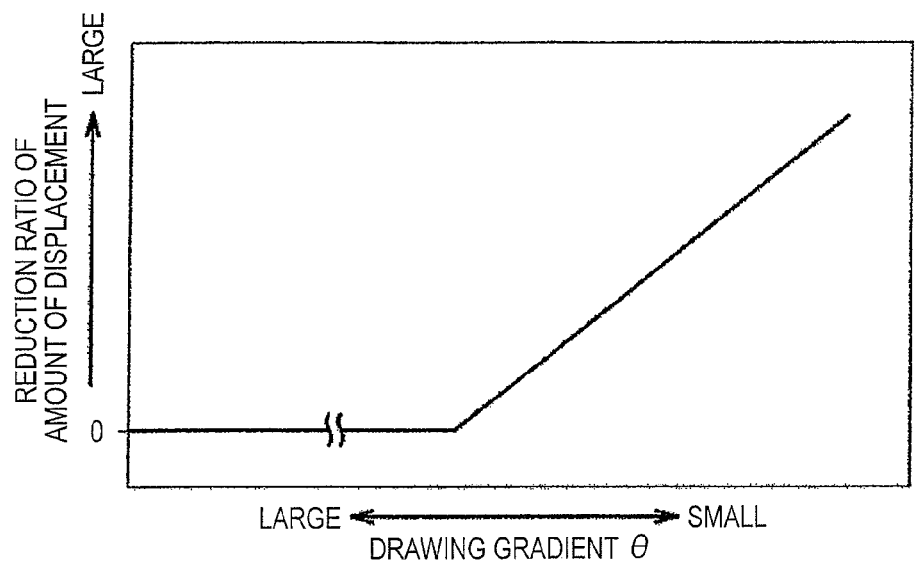
FIG. 17 is a relation diagram of the drawing gradient and a displacement amount reduction ratio showing a concept of a change equation.

As shown in FIG. 16, when the drawing gradient is set to an angle θ formed by a line of 90° relative to the normal direction of the apex and the mold opening direction shown by a void arrow mark, as the drawing gradient is smaller, the larger under is generated so that the grains of the metal mold and the product side interfere with each other during a mold opening operation. Accordingly, as shown in FIG. 17, the change equation is set so that as the drawing gradient θ is smaller, the reduction ratio of the amount of displacement is set to be the more increased. Thus, the amount of displacement is set to be decreased. At this time, the change equation is determined by considering that an actual degree of interference of the metal mold and the product is slightly mitigated due to the shrinkage of a molded resin. The reduction ratio of the amount of displacement is continuously changed in accordance with the drawing gradient.

In step 306, the amount of reference displacement h obtained in the step 302 is multiplied by the reduction ratio of the amount of displacement to calculate an amount of final displacement hf.

Thus, the amount of final displacement h can be changed in such a way that, for instance, when the amount of reference displacement h is 200 μm, if the drawing gradient is larger than 25°, the reduction ratio of the amount of displacement is set to 0% to keep the amount of final displacement hf of 200 μm as it is, and if the drawing gradient is located within a range of 0° to 25°, the reduction ratio of the amount of displacement is set to 90 to 0% to set the amount of final displacement hf to 20 μm to 200 μm.

In step 307, the amount of final displacement hf obtained as described above is set to h(u,v) and the unit vector q of a direction for displacing the apex is used to displace the apexes pb of the polygon mesh Qb in accordance with the above-described equation (15).

In step 308, it is checked whether or not all the apexes of the polygon mesh Qb are completely displaced.

When the displacement of all the apexes is not completed, the process returns to the step 300 to repeat the above-described processes in a next apex remaining in the operation memory.

When the displacement of all the apexes is completed, in step 309, a new polygon mesh is formed respectively by the displaced apexes. Thus, the grain is applied to the patch W.

Figure 18:
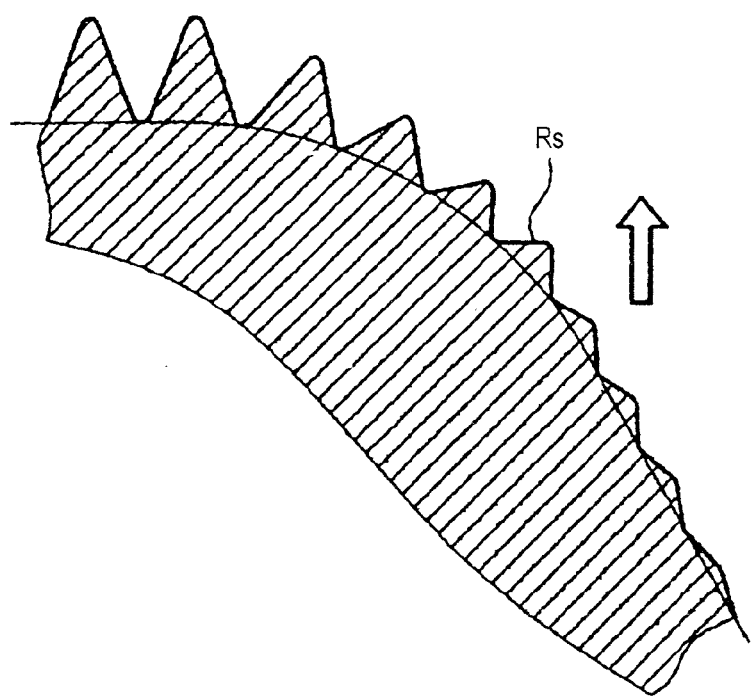
FIG. 18 is a diagram showing a change of the depth of a grain to which the reduction of a displacement amount is applied.

Then, in a position where the drawing gradient is small, by the above-described reduction of the amount of displacement, the product is obtained in which the depth (height) of the grain Rs is continuously changed as shown in FIG. 18 without generating the under between the metal mold and the product. In the drawing, the void arrow mark shows the mold opening direction.

In the present exemplary embodiment, the steps 200 to 208 shown in the flowchart in FIG. 12 form a poly-line forming unit in the present invention. The steps 103 to 106 in the flowchart shown in FIG. 6 form a two-dimensional polygon mesh generating unit.

Further, the steps 107 and 108 in the flowchart shown in FIG. 6 form a three-dimensional polygon mesh generating unit.

The steps 109 to 111 in the flowcharts shown in FIG. 6 and FIG. 7 and the steps 200 to 307 in the flowchart shown in FIG. 14 form an apex displacing unit. Especially, the step 109 forms a texture model generating unit. The step 111 forms a texture model deforming unit.

The step 309 in the flowchart shown in FIG. 14 forms a grain applied polygon mesh generating unit.

The first exemplary embodiment is formed as described above. The product form data defined as the parametric curved surface as an object to which the grain is applied is respectively replaced by the polygon mesh Qb in which the sizes of the polygons are uniformed within a prescribed range. The apexes pb of the polygon mesh are respectively displaced in the normal direction in accordance with the texture data of the grain having the coordinates respectively corresponding to the apexes pb of the polygon mesh. The displaced apexes are connected together to obtain the polygon data of the product form including the grain as surface processed data.

Since the curved surface data that does not have the thickness of the product form is processed to obtain the surface processed data, an amount of data to be treated may be reduced. The sizes of the polygons of the polygon mesh are respectively uniformed so that the grain having little distortion may be obtained. Further, since the apexes of the polygon mesh are respectively displaced in the normal direction in accordance with the texture data, the grain having a good outward appearance can be obtained.

Especially, the surface form data is divided into a plurality of patches W and each patch is replaced by the polygon mesh QB in which the apex spaces are respectively uniformed within a prescribed range. The apexes pb of the above-described polygon mesh Qb are respectively displaced. The displaced apexes are connected together to obtain the polygon data of the product form including the grain. Accordingly, since each of the patches is changed to the polygon mesh, the amount of processed data may be reduced.

In a replacement by the polygon mesh Qb, the borderline K of the patch W as the curved surface forming the product form data is projected on the x-y plane. On the two-dimensional plane, the borderline is changed to the poly-lines. The two-dimensional grid mesh G that covers the border-line Kp changed to the poly-lines is trimmed by the borderline Kp. The two-dimensional polygon mesh Gp is generated from the trimmed grid mesh. The intersections of straight lines respectively extending in the z direction vertical to the x-y plane from the apexes pg of the two-dimensional polygon mesh Gp and the original patch W are connected to change the two-dimensional polygon mesh to the three-dimensional polygon mesh. The three-dimensional polygon mesh Qa is converged and uniformed so that the apexes respectively have equal spaces. Namely, initially, the polygon mesh Gp is generated on the two-dimensional plane, and then, the polygon mesh is changed to the three-dimensional polygon mesh. Accordingly, a calculating process is simple.

When the borderline K is changed to the poly-lines on the x-y plane, since the straight line is divided by the maximum division number among the division numbers by which the length of all the line segments of the poly-lines (Kp) is larger than the length of the diagonal line ss of the square grid SQ of the grid mesh G, the division number is increased so that a high approximation to the original borderline K may be obtained. The length of the straight line is held to be longer than the diagonal line of the square grid, so that intersections with the square grid can be simply calculated.

Since the grid mesh G is common to all the patches W, especially, when the grid mesh G common to all the patches is combined with the formation of the poly-lines by the maximum division number by which the length of all the line segments is larger the length of the diagonal line ss of the square grid SQ of the grid mesh, the borderlines between the adjacent patches are the same poly-lines (Kp) and the apexes of the seams respectively correspond mutually. Accordingly, a misalignment does not occur in the patterns of the seams and a surface having a good external appearance is obtained.

Since the texture data is the image data in which the depth of the grain relative to two-dimensional position coordinates is allocated to the gradations of the densities and the amount of displacement of the apexes pb of the polygon mesh Qb is obtained by multiplying the gradations of the densities of the image data by the prescribed conversion rate, the texture data itself can represent the texture by a small amount of data. Thus, a data process is simplified.

Further, since the amount of displacement of the apexes pb of the polygon mesh Qb is multiplied by the reduction ratio of the amount of displacement depending on the drawing gradient θ of the metal mold to obtain the amount of final displacement hf, when the reduction ratio of the amount of displacement is continuously changed, the depth of the grain can be smoothly changed without generating the under to obtain the surface having the good external appearance.

Further, since the plurality of change equations of the reduction ratio of the amount of displacement are set and may be selected by the operating and input part 22, the proper depth of the grain depending on the drawing gradient can be obtained by considering the shrinkage property of the molding material.

Since the texture model Tma having the designated grid space dt is generated from the texture data and the texture model is deformed correspondingly to the three-dimensionally uniformed polygon mesh Qb to obtain the gradations of the densities from the texture data in accordance with the coordinates of the positions of the deformed texture model Tmb corresponding to the apexes pb of the polygon mesh, the polygon mesh Qb is simply coordinated with the texture data for the purpose of generating the grain having no distortion.

In the present exemplary embodiment, when the borderline is changed to the poly-lines, the common grid mesh G is used to all the patches so that the apexes of the seams between the adjacent patches automatically respectively correspond to each other. However, the apexes of the borderline changed to the poly-lines of the one patch may constitute a restricting condition for changing the other adjacent patch to the poly-lines so that the grid meshes of individual patches may be made to be different so as to meet the forms of curved surfaces.

Further, the grid space d of the grid mesh is previously set as the input data. However, the grid space may be selected from a plurality of grid spaces or arbitrarily inputted by the operation of the operating and input part 22.

Further, the size of the patch may be arbitrarily determined in accordance with the throughput of a computer of the surface processed data forming device.

In the exemplary embodiment, an example is described that the processes after the process for changing the borderline to the poly-lines are carried out for each of the individual patch units defined by the patch information inputted to the data input part 11. However, when the size of the inputted patch is small, a group of patches including the plurality of adjacent patches can be processed as a unit in accordance with the throughput of the computer.

On the contrary, when the surface form data is small, which corresponds to one patch, as a matter of course, the patch does not need to be divided into the plurality of patches.

The borderline formed when the above-described group of patches is processed as the unit serves as a line that defines an outer edge of an entire part of the one group of integrally formed patches. Further, as a plane on which the borderlines of the group of patches in the three-dimensional space are projected when they are changed to two-dimensional borderlines, the projection plane is set so that the patches are not overlapped on each other and they correspond mutually on the basis of 1 to 1. The projection plane is described as the x-y plane in the three-dimensional space of x-y-z. However, the projection plane is not limited thereto and may be an arbitrary plane.

Second Exemplary Embodiment

Now, a second exemplary embodiment will be described below.

In the above-described first exemplary embodiment, the borderline of the parametric curved surface forming the product form data is projected on the two-dimensional plane. The borderline of the product form data is changed to the poly-lines on the two-dimensional plane to generate the polygon mesh. The intersections of the straight lines extending in the direction vertical to the two-dimensional plane from the apexes of the two-dimensional polygon mesh and the original product form data are respectively connected together to obtain the three-dimensional polygon mesh. However, in a special case such as the product form data that z has two values for one x-y coordinate, for instance, when a reflected form part of a meter hood part in a panel board of a motor vehicle is projected on the two-dimensional plane, the above-described method is hardly applied as it is.

Thus, in the second exemplary embodiment, a three-dimensional polygon mesh is directly obtained on a parametric curved surface without projection on a two-dimensional plane.

Figure 19:
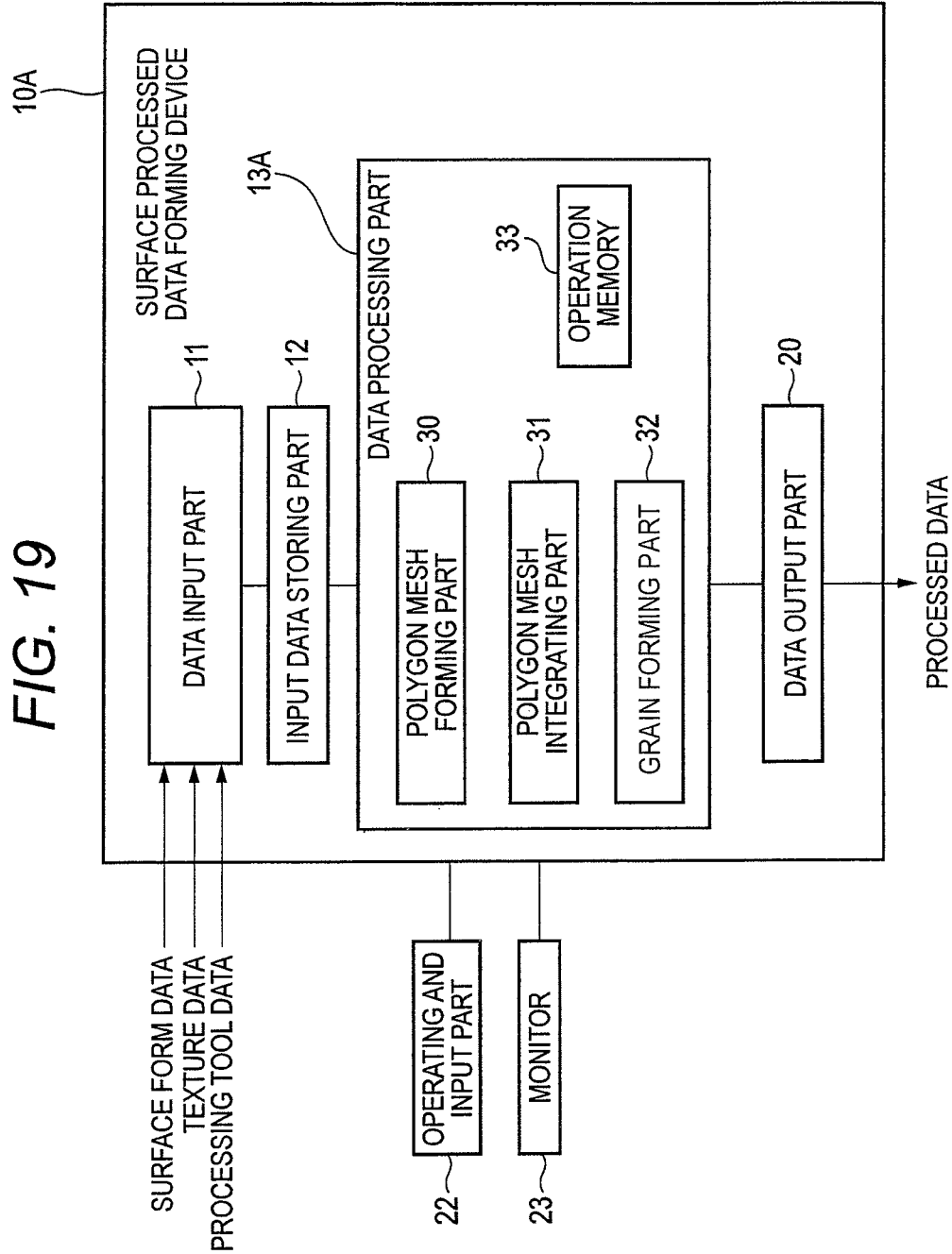
FIG. 19 is a block diagram showing the structure of a device for forming surface processed data according to a second exemplary embodiment.

FIG. 19 is a block diagram showing a structure of a device for forming surface processed data according to a second exemplary embodiment.

A surface processed data forming device 10A of the second exemplary embodiment is the same as the surface processed data forming device 10 of the first exemplary embodiment except that a data processing part 13A is different which generates polygon data having a grain applied to a front curved surface of a product and the data processing part 13A has a function of a polygon data storing part 19. To the same structures, the same reference numerals as those of the first exemplary embodiment are attached.

Also to the surface processed data forming device 10A, an operating and input part 22 or a monitor 23 is connected.

A data output part 20 outputs the polygon data generated in the data processing part 13A as processed data.

Surface form data as product form data inputted to a data input part 11 is defined as a parametric curved surface in which coordinates are respectively designated as a function of parameters u and v of S=F (u, v). The surface form data is formed as patch information that is divided into a plurality of curved surfaces by borderlines previously represented by parametric curves and stored in an input data storing part 12.

Texture data inputted to the data input part 11 is two-dimensional gray scale data of 256 gradations in which the depth of the grain is assigned to a density and has a sufficient area size to cover a grain applied object.

As processing tool data, a mold opening direction of an injection molding metal mold used for calculating a reduction ratio changed in accordance with a drawing gradient is inputted to the data input part 11.

The data processing part 13A includes a polygon mesh forming part 30, a polygon mesh integrating part 31, a grain forming part 32 and an operation memory 33.

The polygon mesh forming part 30 forms a triangular polygon mesh on the parametric curved surface for each patch W. The polygon mesh integrating part 31 integrates the triangular polygon meshes of all the patches W forming the surface form data to one file data.

The grain forming part 32 displaces the positions of apexes in accordance with the gradations of the densities of the texture data respectively corresponding to the apexes of the integrated polygon mesh to generate the polygon data to which the grain is applied.

As for the displacement of the positions of the apexes of the integrated polygon mesh, the reduction ratio of an amount of displacement is applied depending on the drawing gradient of a metal mold to change the amount of displacement and prevent the occurrence of an under during a pattern drawing operation. In the data processing part 13A, a plurality of change equations for determining the reduction ratio of the amount of displacement are previously set. Characteristics of molding materials or the form of the product are taken into consideration so that any of the change equations may be selected by an operation of the operating and input part 22. The reduction of the amount of displacement depending on the drawing gradient of the metal mold is the same as that of the first exemplary embodiment.

In the operation memory 33, processed data respectively in the parts of the data processing part 13A is temporarily stored.

On the monitor 23, the progressing states of the processes including images can be respectively displayed.

Now, a detail of the processes in the above-described surface processed data forming device 10A will be described below.

Figure 20:
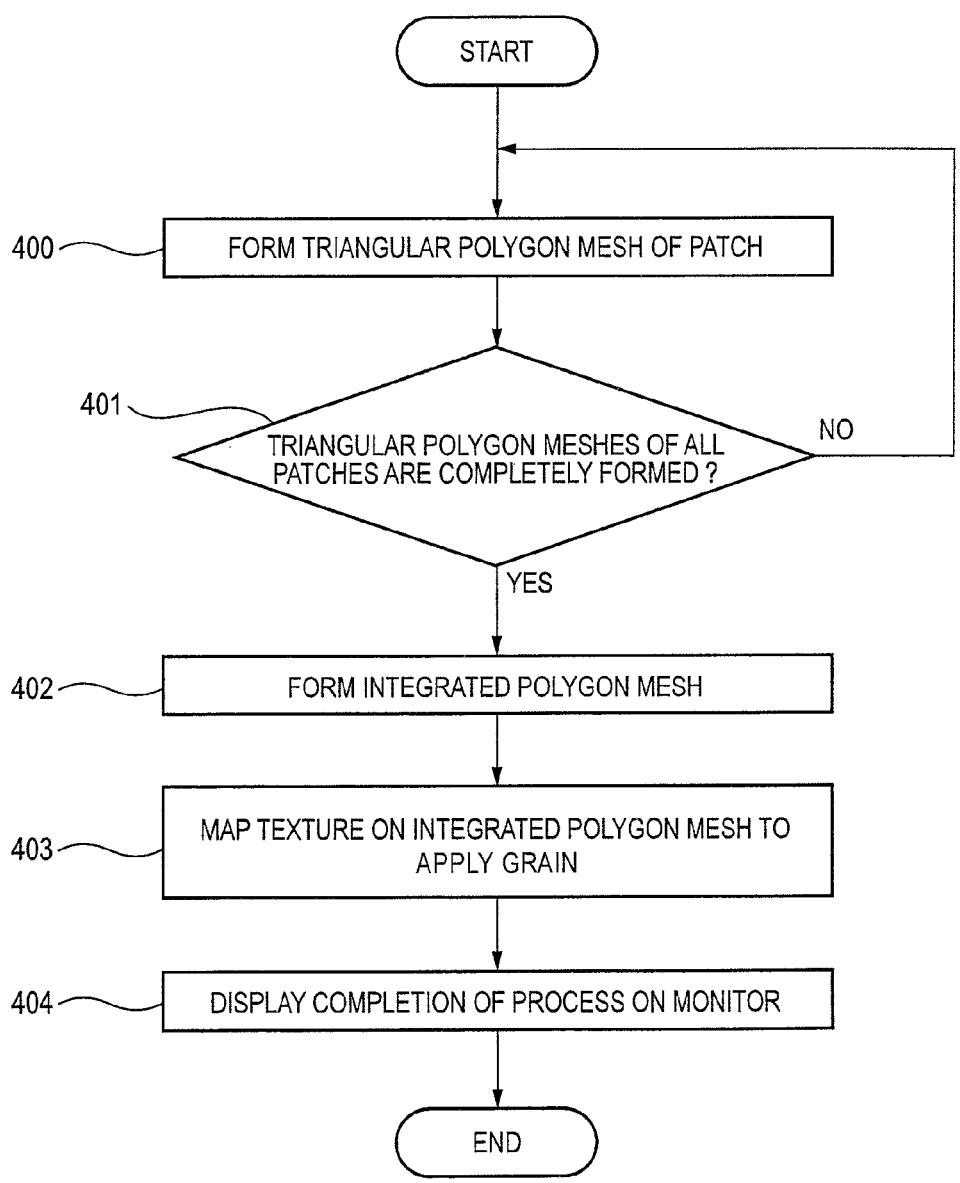
FIG. 20 is a flowchart showing a summary of the flow of processes in the device for forming the surface processed data of the second exemplary embodiment.

FIG. 20 is a flowchart showing the summary of the flow of the processes.

When the surface form data of the product, the texture data of the grain, angle information of the mold opening direction and a below-described space upper limit value b of the integrated polygon mesh are inputted to the data input part 11 by the operation of the operating and input part 22, the data is respectively stored in the input data storing part 12 to start the processes. The change equation for determining the reduction ratio of the amount of displacement is also selected by the operating and input part 22 together with the input of the data.

Initially, in step 400, the polygon mesh forming part 30 reads information of the patch W from the input data storing part 12 to form the triangular polygon mesh Qc.

In step 401, the polygon mesh forming part 30 checks whether or not the patch information that is not yet processed remains in the input data storing part 12, namely, whether or not the triangular polygon meshes Qc of all the patches W are completely formed.

When the triangular polygon meshes Qc of all the patches W are not completely formed yet, the polygon mesh forming part 30 returns to the step 400.

When the triangular polygon meshes Qc of all the patches W are completely formed and the patch information that is not yet processed does not remain in the input data storing part 12, the polygon mesh forming part 30 advances to step 402.

In step 402, the polygon mesh integrating part 31 integrates the triangular polygon meshes Qc of all the patches W to obtain the integrated polygon mesh QT of one file showing one curved surface.

In step 403, the grain forming part 32 moves the apexes of the integrated polygon mesh QT by a displacement mapping in accordance with the texture data and the processing tool data to generate the polygon data to which the grain is applied.

When the polygon data is completely generated, in step 404, the completion of the processes is displayed on the monitor 23 to finish the processes.

After that, the data output part 20 may read the polygon data from the grain forming part 32 by the operation of an operating and input part 22 and output the polygon data to a processor or the like as the processed data.

FIG. 21 is a flowchart showing a detail of the formation of the triangular polygon mesh Qc in the step 400.

Figure 22A:
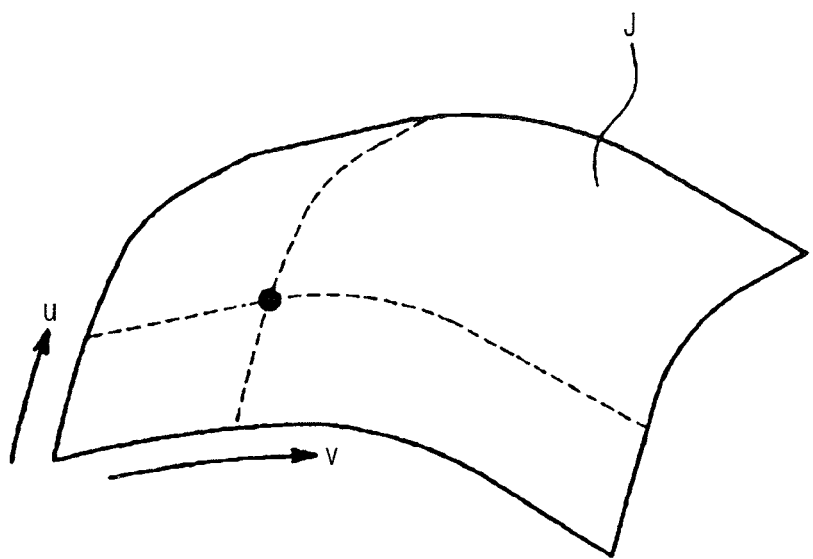
FIG. 22A is a conceptual diagram showing a dividing method in a patch.

In step 410, division numbers of the parameters u and v are calculated which divide a parametric curved surface J of the selected patch as shown in FIG. 22A so that a space of a grid is the space upper limit value b or smaller. For instance, a parameter space (a maximum value–a minimum value) of u of the patch W is divided by a certain integer m to obtain a parameter space c. The patch is divided by using c to compare a grid space with the space upper limit value b. When the grid space is larger than b, m is increased. This process is repeated until all grid spaces are smaller than the space upper limit value b. For the parameter v, the same process is carried out.

Figure 22B:
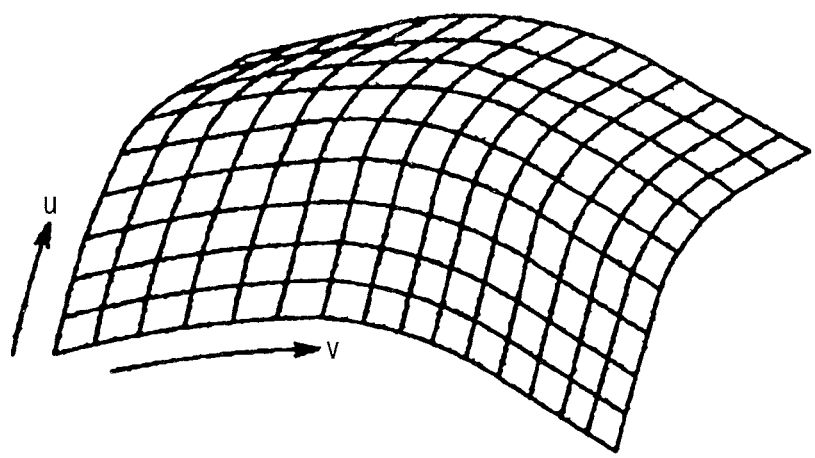
FIG. 22B is a conceptual diagram showing a dividing method in a patch.

FIG. 22B shows division lines on the parametric curved surface.

Figure 23:
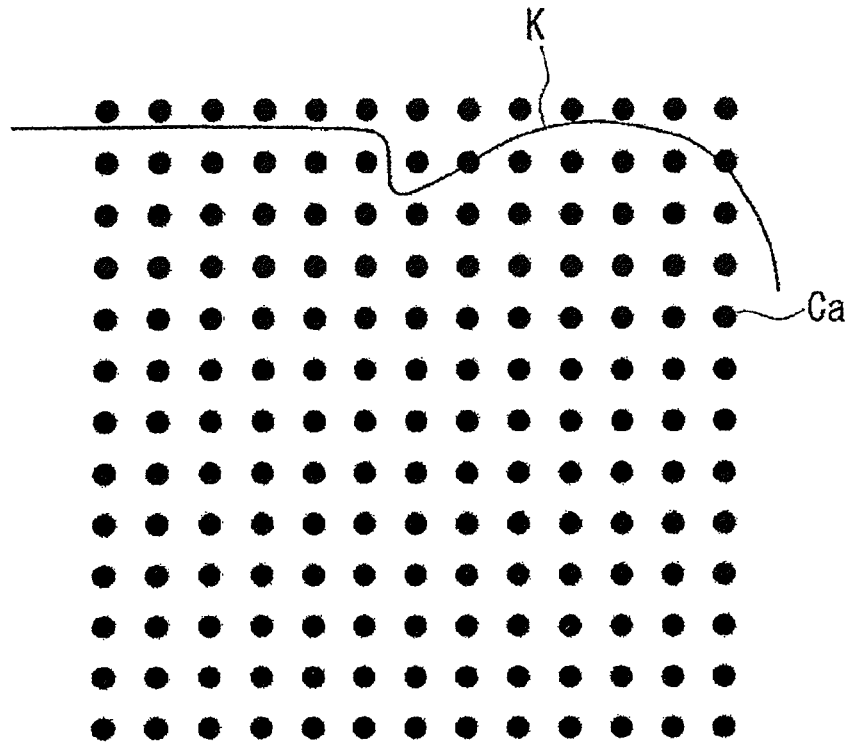
FIG. 23 is a diagram showing grid points and a borderline.

In step 411, parameter values of grid points are respectively calculated by using the division numbers of u and v respectively calculated as described above to form points on the parametric curved surface as shown in FIG. 23. The formed points are referred to as grid points Ca, hereinafter. FIG. 23 is an enlarged diagram along a u-v plane and an iso-parametric curve is omitted for simplification.

In step 412, the grid points Ca for forming the polygon mesh are extracted.

Figure 24:
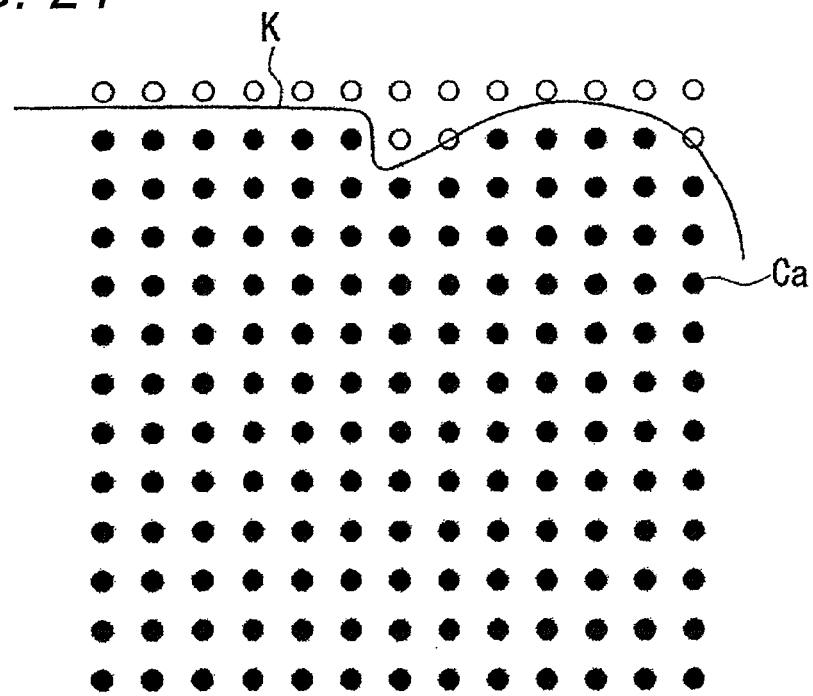
FIG. 24 is an explanatory view showing a way for extracting the grid points forming a polygon mesh.

Specifically, the grid points of the grid points Ca which include the borderline K of the patch W and are located outside the borderline are deleted as shown by void circles in FIG. 24. Further, the grid points which are located inside the borderline K, however, have distances from the borderline smaller than $1/100$ times as long as the grid space are also deleted. The grid space may be the space upper limit value b or an actually dividing grid space.

The borderline K includes a trim line and is shown by a B-spline curve like the first exemplary embodiment. The form of the borderline K is arbitrary for each patch and different from that shown in FIG. 2.

The grid points Ca whose distances from the borderline are smaller than a prescribed distance are eliminated, because a polygon formed by using below-described points on the borderline K is avoided from being extremely small.

Figure 25:
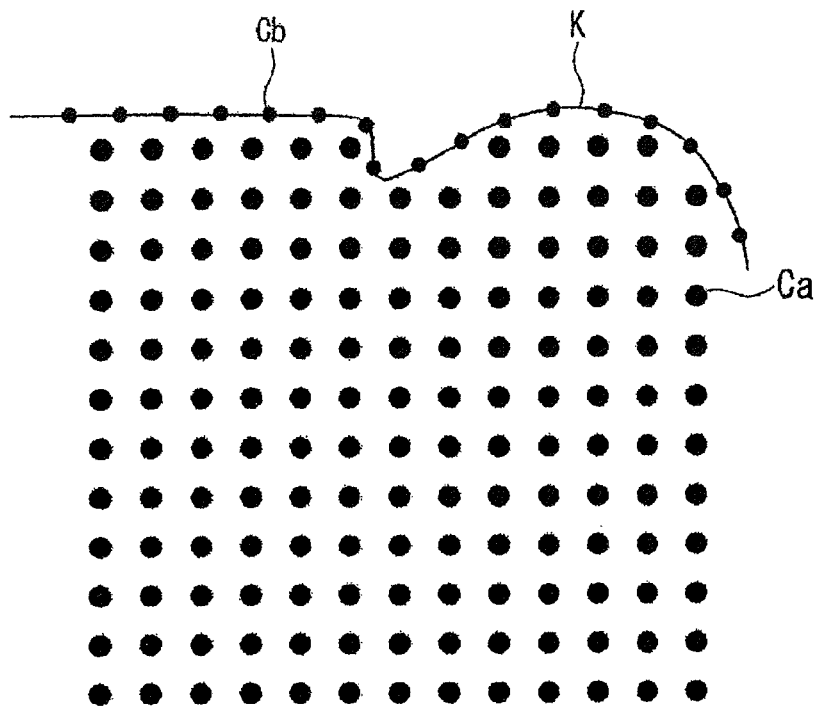
FIG. 25 is an explanatory view showing a way for forming a sequence of points on the borderline.

In step 413, a division number is calculated that divides the borderline K so as to have spaces of the space upper limit value b or smaller. In step 414, as shown in FIG. 25, by using the division number, a sequence of points Cb is formed on the borderline K. Individual points of the sequence of points are designated by Cb hereinafter.

The division value may be set to a value by which an entire periphery is equally divided as in the case of the grid point Ca. However, as for the division of the grid points Ca and the sequence of points Cb, in both the grid points Ca and the sequence of points Cb, the entire periphery may be equally divided by the space upper limit value b and only the last part exceeding the space upper limit value b may be divided by 2. Thus, the grid points and the sequence of points respectively have uniform spaces within a prescribed range.

When adjacent patches W1 and W2 exist, namely, between the patches sharing the borderline, the borderline K1 and the borderline K2 respectively in their patches are expressed by the same curve equation so that the same sequence of points Cb is formed within a range of the borderline K where the patches W1 and W2 are adjacent to each other.

When expression equations do not correspond to each other, the two curves are considered to correspond to each other in view of phase and the sequence of points Cb formed on the borderline K1 of one patch W1 is shared as the sequence of points on the borderline K2 of the other patch W2.

Figure 26:
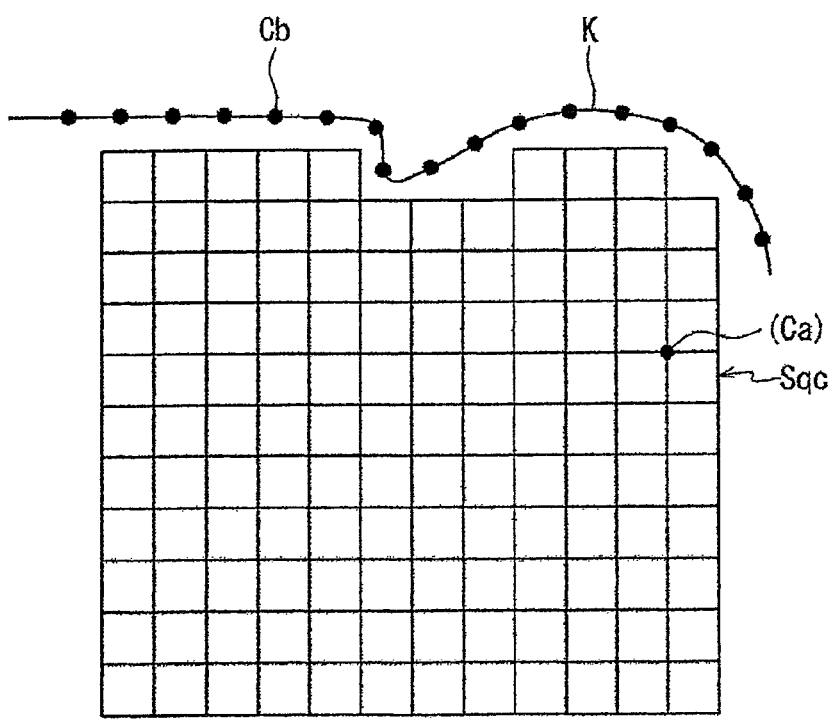
FIG. 26 is a diagram showing a rectangular grid mesh formed by the grid points.

In step 415, by using the grid points Ca extracted in the previous step 412, a square grid mesh Sqc is formed as shown in FIG. 26. Intersections respectively correspond to the grid points Ca, however, a representation of them by black circles is omitted.

Figure 27:
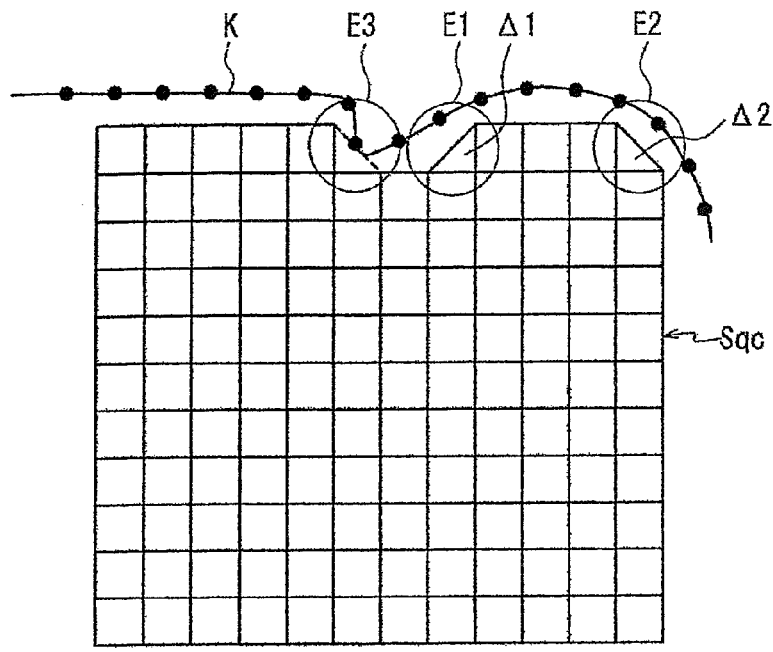
FIG. 27 is an explanatory diagram showing a way for forming triangular forms in recessed parts of an outer periphery of the rectangular grid mesh.

In step 416, when an outer peripheral form of the square grid mesh Sqc is stepped to have a recessed part, as shown in parts E1 and E2 of FIG. 27, two grid points of an outer periphery which sandwich an internal angle of the recessed part are connected together by a straight line to form triangular forms Δ1 and Δ2. However, as shown by a broken line of a part E3, when a straight line connecting the two grid points traverses the borderline K, a triangular form is not formed.

Figure 28:
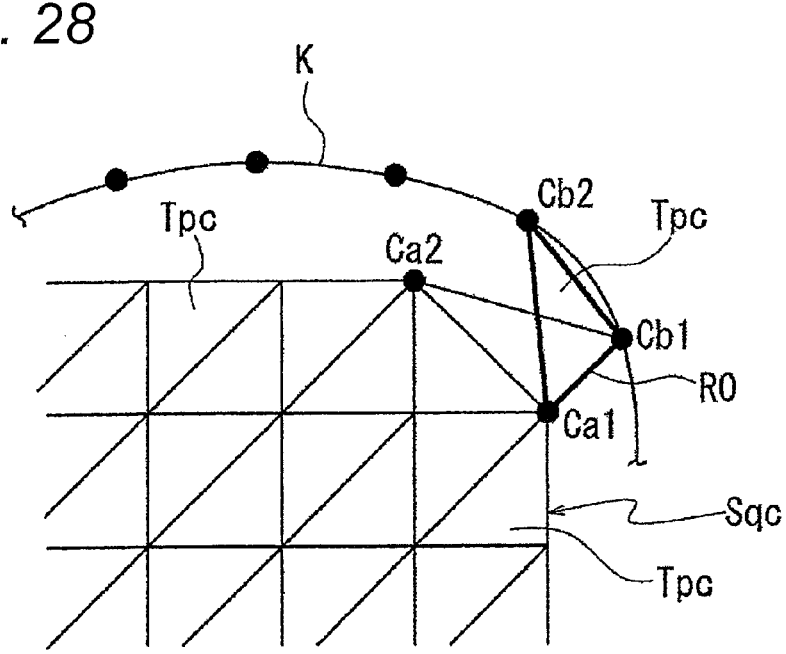
FIG. 28 is a diagram showing a way for forming a triangular polygon by the rectangular grid mesh and the sequence of points on the borderline.

In step 417, as shown in FIG. 28, the grid points located at one set of diagonal positions of each grid of the square grid mesh Sqc are connected together to form a triangular polygon Tpc.

Subsequently, in step 418, the triangular polygon is formed between the grid point Ca located on the outer periphery of the square grid mesh Sqc and the sequence of points Cb on the borderline K.

Here, as shown in FIG. 28, initially, one grid point Ca1 of the grid points located on the outer periphery is selected and connected to a point Cb1 on the borderline K nearest thereto. A connecting straight line R0 is set as one side and an adjacent grid point Ca2 located on the outer periphery of the square grid mesh Sqc is further included to calculate a triangular form ΔCa1-Cb1-Ca2 and an adjacent point Cb2 on the borderline K is further included to calculate a triangular form ΔCa1-Cb1-Cb2. One of the two triangular forms that is close to a regular triangular form is employed as the triangular polygon Tpc.

Whether or not the triangular form is close to the regular triangular form can be decided on the basis of a fact that as a difference between the maximum internal angle and the minimum internal angle of the triangular form is closer to 1, the triangular form is the closer to the regular triangular form or that as a ratio of the longest side to the shortest side is closer to 1, the triangular form is the closer to the regular triangular form.

Then, for the grid points (for instance, Ca2) on the outer periphery of the square grid mesh Sqc which are sequentially adjacent to the selected grid point Ca1, the above-described processes are repeated. As an adjacent direction, a counter-clockwise direction or a clockwise direction may be previously set.

Figure 29:
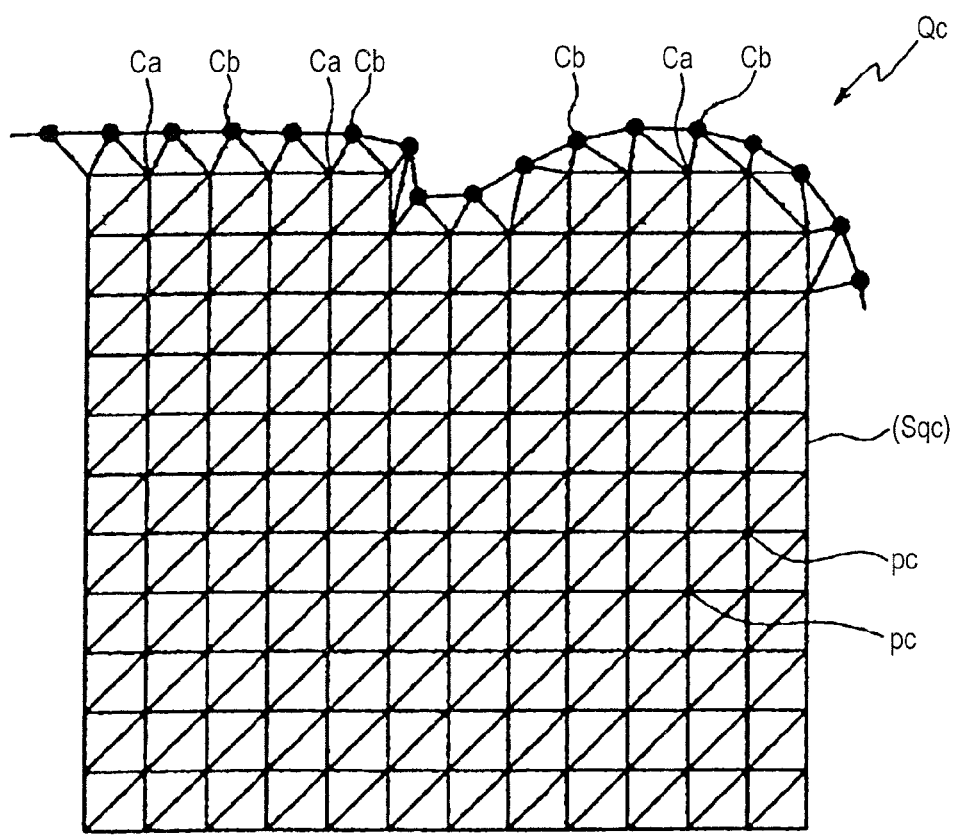
FIG. 29 is a diagram showing the triangular polygon mesh on the patch.

In such a way, as shown in FIG. 29, the triangular polygon mesh Qc extended from the outer periphery of the square grid mesh Sqc to the sequence of points cb on the borderline K is formed on the parametric curved surface J of the patch.

In step 419, the triangular polygon mesh Qc is shaped by an edge swap. The triangular polygon mesh formed in the step 418 shows a process in which the triangular form close to the regular triangular form having a good form is selected and formed for each step, however, when the entire part of the formed triangular polygon mesh is viewed, a better triangular form may be occasionally formed by an edge swapping.

Figure 30:
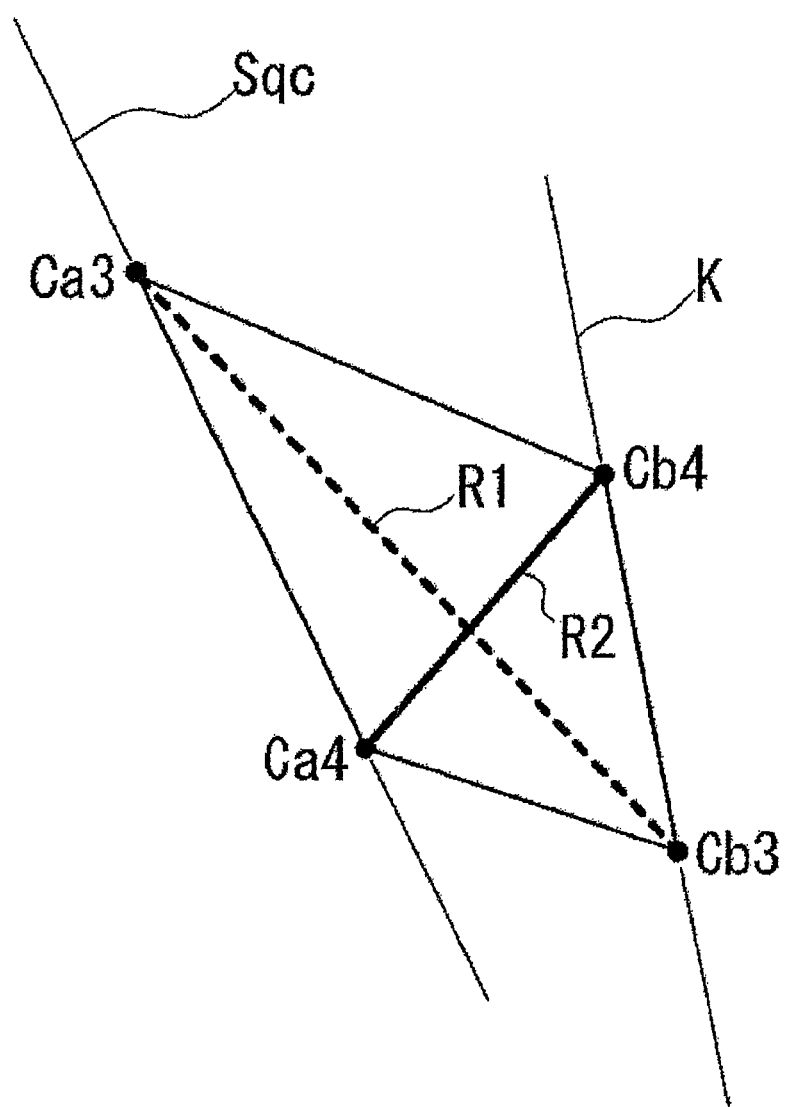
FIG. 30 is an explanatory view showing a way for shaping the triangular polygon mesh.

Here, relative to one edge line R1 shown by a broken line in FIG. 30 that connects a grid point Ca3 on the outer periphery of the square grid mesh Sqc to a point Cb3 on the borderline and has triangular polygons provided at both sides thereof, as shown by a thick full line, an edge line R2 is calculated that connects a point Cb4 on the borderline forming the one triangular polygon to a grid point Ca4 on the outer periphery forming the other triangular polygon. Then, two triangular forms (the triangular forms after the edge swap) formed in both the sides of the new edge line R2 are obtained.

As shown in FIG. 30, when the two triangular forms ΔCa4-Cb4-Ca3 and ΔCa4-Cb4-Cb3 after the edge swap are closer to the regular triangular form than the two triangular forms ΔCa3-Cb3-Cb4 and ΔCa3-Cb3-Ca4 before the edge swap, the edge line R1 of the broken line is deleted to replace the triangular forms before the edge swap by the triangular forms ΔCa4-Cb4-Ca3 and ΔCa4-Cb4-Cb3 after the edge swap and use the triangular forms after edge swap as the triangular polygons.

To the sequentially adjacent grid points on the outer periphery of the square grid mesh Sqc, the above-described processes are repeated to shape the triangular polygon mesh Qc.

As described in the process of the step 414, since the sequence of points of the borderline is shared between the patches sharing the borderline, when the triangular polygon meshes Qc are integrated in the step 402, the patches are respectively continuous without breaks to form one integrated polygon mesh QT.

The grid points Ca and the points Cb on the borderline become apexes pc (see FIG. 29) of the integrated polygon mesh QT.

Figure 31:
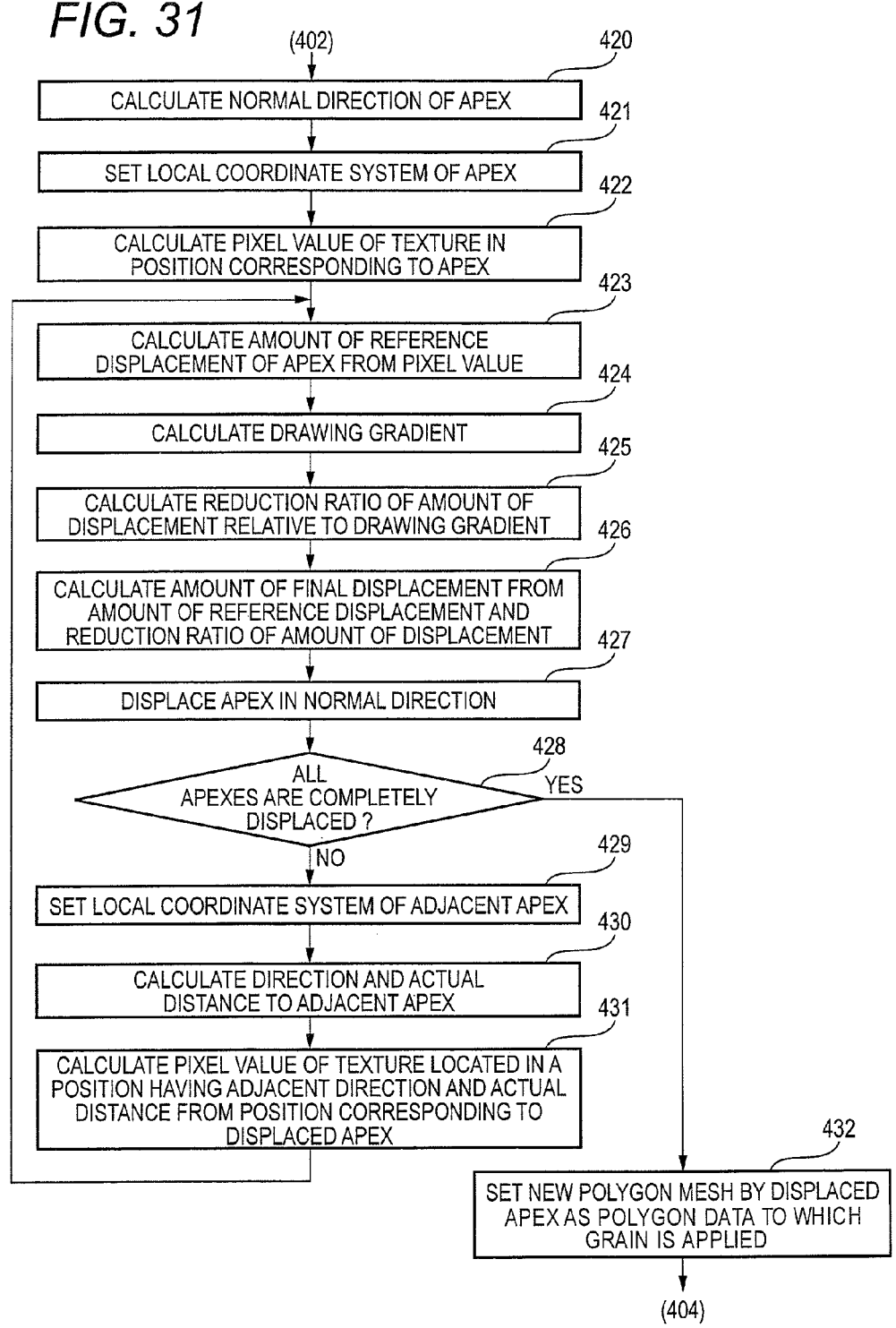
FIG. 31 is a flowchart showing a detail of a displacement mapping process.

Now, FIG. 31 is a flowchart showing a detail of a process for applying the grain in the grain forming part 32 by the displacement mapping in the step 403.

Initially, in step 420, one of the apexes pc of the integrated polygon mesh QT is selected to calculate a normal direction of the apex pc.

The normal direction may be obtained from the parametric curved surface by using the parameter values of the apex pc or the normal direction may be obtained as an average of the normal directions of the polygons in the periphery including the apex as in the step 303 of the first exemplary embodiment.

In subsequent step 421, a local coordinate system of the apex pc is determined.

Figure 32:
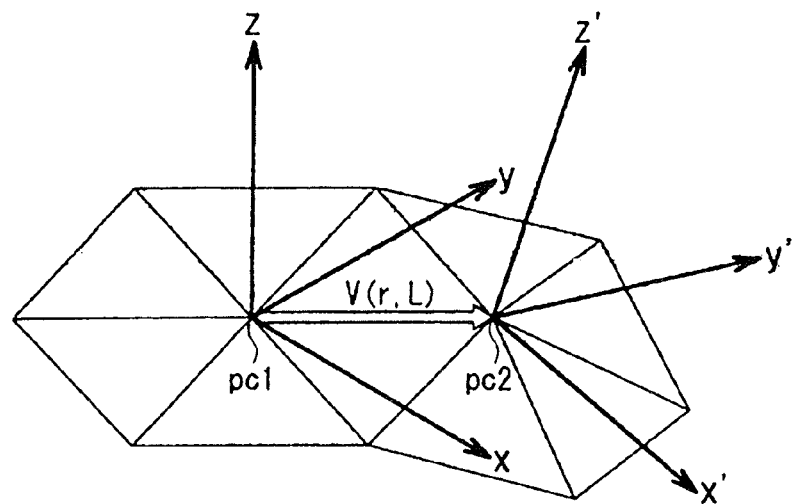
FIG. 32 is a diagram showing a local coordinate system of apexes of the triangular polygon mesh.

Here, as shown in FIG. 32, the normal direction of the apex is set to a z-axis and two directions orthogonal to the z-axis are set to an x-axis and a y-axis. Thus, the local coordinate system has position information and information of the normal direction.

In step 422, a prescribed position of the texture data is allowed to correspond to the selected apex to calculate a pixel value (density) g of the prescribed position by a bilinear interpolation from pixel values of four pixels in the periphery thereof.

The position of the apex selected in the step 420 is arbitrary, however, when, for instance, a central apex of the integrated polygon mesh QT is selected in a first flow and the prescribed position of the texture data corresponding thereto is set to a central point, an image area of the texture data may have such a size that can cover the area of the integrated polygon mesh.

In step 423, in accordance with a conversion rate of the pixel value g and the depth of the grain, an amount of reference displacement of the apex is obtained.

In step 424, in accordance with the mold opening direction of the metal mold as an object to be processed and the normal direction of the apex coordinate which are previously set and stored in the input data storing part 12, the drawing gradient is calculated.

Then, in step 425, the reduction ratio of the amount of displacement in the position of the apex is obtained in accordance with the change equation of the depth of the grain to the drawing gradient.

In step 426, the amount of reference displacement obtained in the step 423 is multiplied by the reduction ratio of the amount of displacement to calculate an amount of final displacement.

In step 427, the apex is displaced by the amount of final displacement obtained as described above in the normal direction (the direction of the z-axis) obtained in the step 420.

The processes including the process for obtaining the pixel value (the density) g in the step 422 to the process for displacing the apex in the step 427 are the same as the steps 301 to 307 in the first exemplary embodiment.

Then, in step 428, it is checked whether or not the apex remains in which the above-described processes are not yet carried out.

When the apex remains which is not yet processed, the process advances to step 429, and when the apex does not remain which is not yet processed, the process advances to step 432.

In the step 429, as shown in FIG. 32, a local coordinate system of a new adjacent apex pc2 (=an apex which is not yet processed) is determined which is connected to the apex pc1 displaced in the normal direction in the integrated polygon mesh QT. In step 430, a vector V (a direction r and an actual distance L) from the position before a displacement of the apex pc1 displaced in the normal direction to the adjacent apex pc2 connected to the apex is obtained.

Figure 33:
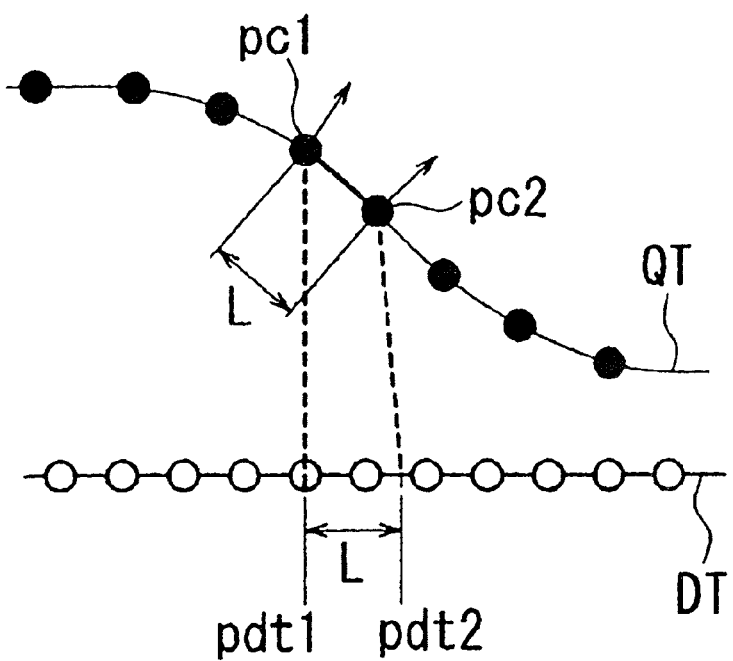
FIG. 33 is an explanatory view showing a way for reading pixel values from texture data.

In step 431, as shown in FIG. 33, a pixel value (density) g of a position Pdt2 having the direction r and the actual distance L obtained in the previous step separating from a position Pdt1 (the prescribed position) of the texture data DT corresponding to the apex pc1 displaced in the normal direction is calculated by a bilinear interpolation from pixel values of four pixels in the periphery thereof. Black circles in FIG. 33 show a sequence of points in a plane including the direction r.

After that, the process returns to the step 423 to repeat the displacement of the apexes respectively in the normal direction based on the texture data.

When the displacement of all the apexes pc in the normal direction based on the texture data is finished, the process advances to the step 432 from the step 428 to connect respectively the displaced apexes at new positions and obtain the polygon data to which the grain is applied.

In the present exemplary embodiment, the steps 410 to 412 in the flowchart shown in FIG. 21 form a grid point forming unit in the present invention. The steps 413 and 414 form a sequence of points forming unit. The steps 415 to 419 form a polygon mesh forming unit.

Further, the step 402 in the flowchart shown in FIG. 20 forms a polygon mesh integrating unit.

The steps 420 to 431 in the flowchart shown in FIG. 31 form an apex displacing unit and the step 432 forms a grain applied polygon mesh generating unit.

The second exemplary embodiment is formed as described above. The product form data defined as the parametric curved surface of an object to which the grain is applied is replaced by the polygon mesh Qc in which the sizes of the polygons are respectively uniformed within a prescribed range. The apexes pb of the polygon mesh are respectively displaced in the normal direction in accordance with the texture data of the grain having the coordinates respectively corresponding to the apexes pb of the polygon mesh. The displaced apexes are connected together to obtain the polygon data of the product form including the grain as surface processed data.

Since the curved surface data that does not have the thickness of the product form is processed to obtain the surface processed data, an amount of data to be treated may be reduced. The sizes of the polygons of the polygon mesh are respectively uniformed within a prescribed range so that the grain having little distortion may be obtained. Further, since the apexes of the polygon mesh are respectively displaced in the normal direction in accordance with the texture data, the grain having a good outward appearance can be obtained.

Especially, in the replacement of the surface form data by the polygon mesh, the surface form data is divided into a plurality of patches W, the polygon meshes are respectively formed for the patches, and then, the polygon meshes of all the patches are integrated to one polygon mesh Qc. Accordingly, a limited calculating process is repeated for each patch so that the polygon mesh of an entire part of the surface form data may be simply formed.

When the polygon mesh is formed in each of the patches, in a parameter space of the parametric curved surface, the grid points are formed by the division lines which divide the patch at uniform intervals within a prescribed range and the sequence of points are formed on the borderline at uniform intervals within the same prescribed range. The grid points are connected together within the borderline to form the grid mesh and the grid points in the outer periphery of the grid mesh are connected to the sequence of point on the borderline to form the triangular polygons and obtain the three-dimensional polygon mesh from the grid mesh and the triangular polygons. Accordingly, in the second exemplary embodiment, since a projection on the two-dimensional and a restoring process to a three-dimensional form are not carried out, a burden for a calculation is reduced and a processing time is shortened. Further, the distortion does not occur due to a two-dimensional process and a three-dimensional process.

Since the sequence of points on the borderline is shared as the same position between the adjacent patches, the patches are respectively continuous without breaks so that the patches may be easily integrated to one polygon mesh.

Further, in the triangular polygon formed by the grid point and the sequence of points on the borderline, one of the triangular forms that is close to a regular triangular form is employed and created of the triangular forms including as one side respectively a straight line for connecting one selected grid point to a point on the borderline K nearest thereto and an adjacent grid point located on the outer periphery of the grid mesh, and an adjacent point on the borderline. Thus, the polygon formed along the borderline does not have an extremely abnormal form to polygons of other parts, so that a homogeneous polygon mesh is obtained.

The local coordinate system is set in each of the apexes of the integrated polygon mesh Qc to calculate the direction and the actual distance from the apex selected and allowed to correspond to the prescribed position of the two-dimensional texture data to the adjacent apex connected thereto in accordance with the local coordinate system and set a position having the above-described direction and the actual distance from the prescribed position of the texture data as a coordinate corresponding to the adjacent apex. Accordingly, the polygon mesh is simply coordinated with the texture data. As compared with the previous exemplary embodiment that requires the uniform process of the three-dimensional polygon mesh by the repetitive calculations or the deformation of the texture model, the application of the grain can be realized with extremely little distortion by the small number of times of calculations.

In the second exemplary embodiment, similarly to the previous exemplary embodiment, the size of the patch may be arbitrarily determined in accordance with the throughput of a computer of the surface processed data forming device.

In the second exemplary embodiment, an example is described that the triangular polygon mesh is formed for each of the individual patch units defined by the patch information inputted to the data input part 11. However, when the surface form data is small, which corresponds to one patch, as a matter of course, the surface form data does not need to be divided into the plurality of patches. A process for integrating the polygon meshes in the step 402 shown in FIG. 20 is not necessary.

In this exemplary embodiment, an example is described that as the parametric curve of the borderline, the B-spline curve is used, however, the present invention may be similarly applied to other parametric curves.

The texture data is provided by the gray scale image data having the 256 gradations, however, the present invention is not limited thereto and image data may be used in which depth information of the grain is given to the densities of a plurality of color components. Further, the resolution R of the image data is previously set as input data, however, the resolution may be selected from a plurality of resolutions by the operation of the operating and input part 22 or arbitrarily inputted.

A prescribed direction in which the apexes pb and pc of the polygon meshes Qb and Qc are respectively displaced in accordance with the texture data of the grain is set to the normal direction, however, the prescribed direction may be set to an arbitrary direction.

In the displacement mapping of the grain, as for the reduction of the amount of displacement relative to the drawing gradient, the reduction ratio is continuously changed, however, it is to be understood that the reduction ratio may be intentionally gradually changed in an arbitrary step.

Further, the change equation for determining the reduction ratio of the amount of displacement is selected together with the input of the surface form data and the texture data when the process is started. However, at the stage of the displacement mapping, after a display is shown for obtaining a selection on the monitor to wait for a selecting operation, the process of the displacement mapping may be started.

INDUSTRIAL APPLICABILITY

The present invention is employed in a manufacturing field of various kinds of resin products that forms the grains on the surfaces of the products to achieve many effects.

DESCRIPTION OF REFERENCE NUMERALS 10, 10A . . . surface processed data forming device
11 . . . data input part
12 . . . input data storing part
13, 13A . . . data processing part
14 . . . plane polygon forming part
15 . . . three-dimensional polygon forming part
16 . . . texture model forming and deforming part
17, 32 . . . grain forming part
18, 33 . . . operation memory
19 . . . polygon data storing part
20 . . . data output part
22 . . . operating and input part
23 . . . monitor
30 . . . polygon mesh forming part
31 . . . polygon mesh integrating part
32 . . . grain forming part
33 . . . operation memory
Ca, Ca1, Ca2, Ca3, Ca4 . . . grid point
Cb . . . sequence of points
Cb1, Cb2, Cb3, Cb4 . . . point on borderline
DT . . . texture data
G . . . grid mesh
Gp . . . (two-dimensional) polygon mesh
J . . . parametric curved surface
K . . . borderline
Kp . . . borderline (changed to poly-lines)
Kp1, Kp2 . . . poly-lines
pa, pb, pc, pc1, pc2, pg, pg1, pg2 . . . apex
Qa, Qb . . . (three-dimensional) polygon mesh
Qc . . . triangular polygon mesh QT . . . integrated polygon mesh
SQ . . . square grid mesh
Sqc . . . square grid mesh
ss . . . diagonal line
Tma, Tmb . . . texture model
Tp1, Tp2, Tpc . . . triangular polygon
θ . . . drawing gradient
V . . . vector
W . . . patch
Δ1, Δ1 . . . triangular form

The invention claimed is:

1. A method for forming surface processed data relating to an existing object, the existing object including a mold for use in forming a resin device, the method comprising:
   obtaining a surface form of an existing object;
   applying a grain to the surface form of the object by replacing surface form data of the object with a three-dimensional polygon mesh;
   displacing each of apexes of the polygon mesh in a prescribed direction calculated from each polygon mesh sharing the apex in accordance with texture data of the grain and processing tool data, the processing tool data including a mold opening direction of the mold;
   generating new polygon mesh data in accordance with the apexes displaced in the prescribed direction; and
   determining the new polygon mesh data as surface processed data to which the grain is applied,
   wherein an amount of displacement that each of apexes is displaced is set to an amount of final displacement obtained by multiplying an amount of reference displacement by a reduction ratio of an amount of displacement, where the reference displacement is based on the texture data, a drawing gradient of a metal mold is based on the processing tool data, and the reduction ratio varies based on the drawing gradient.

2. The method for forming surface processed data according to claim 1, wherein the prescribed direction is a normal direction.

3. The method for forming surface processed data according to claim 1, wherein the texture data is image data in which the depth of the grain relative to a two-dimensional position coordinate is assigned to the gradation of density and the amount of displacement of the apex of the polygon mesh is obtained by multiplying the gradation of the density of the image data by a prescribed conversion rate.

4. The method for forming surface processed data according to claim 3, wherein a texture model having a designated grid space is formed from the texture data, the texture model is deformed so as to meet an inclination of a curved surface forming the product form data and the gradation of the density is obtained from the texture data in accordance with the position coordinate of the deformed texture model corresponding to the apex of the polygon mesh.

5. The method for forming surface processed data according to claim 1, wherein the product form data is divided into a plurality of patches and each of the patches is replaced by the polygon mesh in which spaces between the apexes are uniformed within a prescribed range.

6. The method for forming surface processed data according to claim 5, wherein the replacement of the patch by the polygon mesh includes a step of projecting a borderline of the patch on a two-dimensional plane and changing the borderline to poly-lines on the two-dimensional plane; trimming a two-dimensional grid mesh covering the borderline changed to the poly-lines by the borderline; forming a two-dimensional polygon mesh from the trimmed grid mesh; connecting together intersections of straight lines extending in vertical directions to the two-dimensional plane respectively from the apexes of the two-dimensional polygon mesh and the original patch to three-dimensionally form the polygon mesh; and converging and allowing the three-dimensional polygon mesh to be uniformed so that the apexes are arranged at equal intervals.

7. The method for forming surface processed data according to claim 6, wherein when the borderline is changed to the poly-lines on the two-dimensional plane, the projected borderline is divided by straight lines of a maximum division number among division numbers by which the length of each of the line segments of the poly-lines is larger than the length of a diagonal line of the square grid of the square grid mesh.

8. The method for forming surface processed data according to claim 6, characterized in that spacing between grids is common to all the patches.

9. The method for forming surface processed data according to claim 5, wherein the texture data is image data in which the depth of the grain relative to a two-dimensional position coordinate is assigned to the gradation of density and the amount of displacement of the apex of the polygon mesh is obtained by multiplying the gradation of the density of the image data by a prescribed conversion rate.

10. The method for forming surface processed data according to claim 9, wherein the amount of displacement of the apex of the polygon mesh is set to an amount of final displacement obtained by multiplying by reduction ratios of an amount of displacement depending on a drawing gradient of a metal mold.

11. The method for forming surface processed data according to claim 1, wherein when a patch is replaced by the polygon mesh, grid points are formed by prescribed division lines in a parameter space of a parametric curved surface of the product form data, a sequence of points are formed at prescribed intervals on a borderline, and the grid point located inside the borderline and the sequence of points on the borderline are used to form a three-dimensional triangular polygon having apexes respectively located on the parametric curved surface.

12. A method for forming surface processed data relating to an existing object, the existing object including a mold for use in forming a resin device, the method comprising:
   applying a grain to a surface form of a previously obtained existing object;
   dividing the surface form of the object to which a the grain was applied into a plurality of patches;
   forming grid points by prescribed division lines in a parameter space of a parametric curved surface of each of the patches and forming a sequence of points at prescribed intervals on a borderline of the patch;
   using the grid points located inside the borderline and the sequence of points on the borderline to form a three-dimensional polygon mesh having apexes respectively located on the parametric curved surface;
   then, integrating the polygon meshes of all the patches to one polygon mesh;
   displacing the apexes respectively in their normal directions in accordance with (i) texture data of the grain having coordinates respectively allowed to correspond to the apexes of the integrated polygon mesh and (ii) processing tool data, the processing tool data including a mold opening direction of the mold; and
   connecting together the displaced apexes to obtain polygon data of the surface form including the grain,
   wherein an amount of displacement that each of apexes is displaced is set to an amount of final displacement obtained by multiplying an amount of reference displacement by a reduction ratio of an amount of displacement, where the reference displacement is based on the texture data, a drawing gradient of a metal mold is based on the processing tool data, and the reduction ratio varies based on the drawing gradient.

13. The method for forming surface processed data according to claim 12, wherein the division lines forming the grid points and the sequence of points on the border line respectively have uniform spaces within a prescribed range, and when the three-dimensional polygon mesh is formed, the grid points located inside the borderline are connected together to form a grid mesh, the grid mesh is changed to the triangular polygons and the grid points on the outer periphery of the grid mesh are connected to the sequence of points on the borderline to form the triangular polygons.

14. A method for forming surface processed data according to claim 13, wherein as the triangular polygon formed by connecting the grid point on the outer periphery of the grid mesh to the sequence of points on the borderline, one of the triangular forms that is close to a regular triangular form is employed and created of the triangular forms including as one side respectively a straight line for connecting one selected grid point to a point on the borderline nearest thereto and an adjacent grid point located on the outer periphery of the grid mesh, and an adjacent point on the borderline.

15. The method for forming surface processed data according to claim 12, wherein the sequence of points on the borderline is shared as the same position between the adjacent patches.

16. The method for forming surface processed data according to claim 12, wherein the texture data is image data in which the depth of the grain relative to a two-dimensional position coordinate is assigned to the gradation of density, a local coordinate system is set in each of the apexes of the integrated polygon mesh, a selected apex is allowed to correspond to a prescribed position of the texture data to calculate a direction and an actual distance from the selected apex to the apex connected thereto in accordance with the local coordinate system and a position having the direction and the actual distance from the prescribed position of the texture data is set as a coordinate corresponding to the apex connected to the selected apex, and the amount of displacement of the apex of the polygon mesh is obtained by multiplying the gradation of the density of the image data of the coordinate corresponding to the apex by a prescribed conversion rate.

17. A device for forming surface processed data that inputs patches obtained by (i) dividing into a plurality of parts surface form data of an existing object to which a grain is applied, the existing object including a mold for use in forming a resin device, and (ii) texture data of the grain to form surface processed data of the existing object, the device for forming surface processed data comprising:
    a plane polygon forming part that project a borderline of the patch on a two-dimensional plane to change the borderline to poly-lines;
    the plane polygon forming part forms a polygon mesh having the borderline changed to the poly-lines as an outer edge;
    a three-dimensional polygon mesh forming part that three-dimensionally forms the two-dimensional polygon mesh;
    a texture model forming and deforming part that displaces apexes respectively in their normal directions in accordance with (i) the texture data of the grain having coordinates respectively corresponding to the apexes of the three-dimensional polygon mesh and (ii) processing tool data, the processing tool data including a mold opening direction of the mold; and
    a grain forming part that connects together the apexes displaced by the texture model forming and deforming part to form a grain applied polygon mesh including the grain and output data of the grain applied polygon mesh as the surface processed data,
    wherein an amount of displacement that each of apexes is displaced is set to an amount of final displacement obtained by multiplying an amount of reference displacement by a reduction ratio of an amount of displacement, where the reference displacement is based on the texture data, a drawing gradient of a metal mold is based on the processing tool data, and the reduction ratio varies based on the drawing gradient.

18. The device for forming surface processed data according to claim 17, wherein the plane polygon forming part divides the projected borderline by straight lines of a maximum division number among division numbers by which the length of each of the line segments of the poly-lines is larger than the length of a diagonal line of a square grid of a prescribed grid mesh and the prescribed grid mesh is common to all the patches.

19. The device for forming surface processed data according to claim 18, wherein plane polygon forming part covers the borderline changed to the poly-lines and overlaps the grid mesh thereon, and trims the grid mesh by the borderline to change the grid mesh to polygons, and the three-dimensional polygon forming part connects intersections of straight lines respectively extending in vertical directions to the two-dimensional plane from the apexes of the two-dimensional polygon mesh and the original patch to form the three-dimensional polygon mesh and further make the polygons uniform.

20. The device for forming surface processed data according to claim 19, wherein the texture data is image data in which the depth of the grain relative to a two-dimensional position coordinate is assigned to the gradation of density, the texture model forming and deforming part forms a texture model having a designated grid space and deforms the texture model so as to correspond to an inclination of a curved surface of the product form data and the gradation of the density is obtained from the texture data in accordance with the position coordinate of the deformed texture model corresponding to the apex of the uniformed three-dimensional polygon mesh and an amount of displacement of the apex is obtained by multiplying the gradation of the density by a prescribed conversion rate.

21. The device for forming surface processed data according to claim 17, wherein a plurality of change equations of the reduction ratio of the amount of displacement are set and may be selected by an operating and input part.

22. A device for forming surface processed data that inputs patches obtained by (i) dividing into a plurality of parts surface form data of an existing object to which a grain is applied, the existing object including a mold for use in forming a resin device, and (ii) texture data of the grain to form surface processed data of the existing object, the device for forming surface processed data comprising:
    a polygon mesh forming part that forms grid points by division lines for dividing the patch at uniform intervals within a prescribed range in a parameter space of a parametric curved surface of each of the patches;
    the polygon mesh forming part forms a sequence of points at uniform intervals within the prescribed range on a borderline of the patch;

a the polygon mesh forming part unit that forms a three-dimensional polygon mesh from the grid points within the borderline and the sequence of points on the borderline;

a polygon mesh integrating part integrates the polygon meshes of all the patches to one polygon mesh;

a grain forming part that displaces apexes respectively in their normal directions in accordance with (i) the texture data of the grain having coordinates respectively corresponding to the apexes of the integrated polygon mesh and (ii) processing tool data, the processing tool data including a mold opening direction of the mold; and the grain forming part connects together the apexes to form a grain applied polygon mesh including the grain and output data of the grain applied polygon mesh as the surface processed data, wherein an amount of displacement that each of apexes is displaced is set to an amount of final displacement obtained by multiplying an amount of reference displacement by a reduction ratio of an amount of displacement, where the reference displacement is based on the texture data, a drawing gradient of a metal mold is based on the processing tool data, and the reduction ratio varies based on the drawing gradient.

23. The device for forming surface processed data according to claim 22, wherein the texture data is image data in which the depth of the grain relative to a two-dimensional position coordinate is assigned to the gradation of density, the grain forming part allows a selected apex to correspond to a prescribed position of the texture data to calculate a direction and an actual distance from the selected apex to an apex connected thereto and sets a position having the direction and the actual distance from the prescribed position in the texture data as a coordinate corresponding to the apex connected to the selected apex and an amount of displacement of the apex of the polygon mesh is obtained by multiplying the gradation of the density of the image data of the coordinate corresponding to the apex by a prescribed conversion rate.

* * * * *